(12) United States Patent
Kawai et al.

(10) Patent No.: US 10,890,625 B2
(45) Date of Patent: Jan. 12, 2021

(54) BATTERY STATE ESTIMATING DEVICE

(71) Applicant: DENSO CORPORATION, Kariya (JP)

(72) Inventors: Toshiyuki Kawai, Kariya (JP); Keiichi Kato, Kariya (JP); Yuji Koike, Kariya (JP); Hideaki Tanaka, Kariya (JP); Shuntaro Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 258 days.

(21) Appl. No.: 16/074,463

(22) PCT Filed: Jan. 20, 2017

(86) PCT No.: PCT/JP2017/001984
§ 371 (c)(1),
(2) Date: Aug. 1, 2018

(87) PCT Pub. No.: WO2017/135075
PCT Pub. Date: Aug. 10, 2017

(65) Prior Publication Data
US 2019/0064276 A1 Feb. 28, 2019

(30) Foreign Application Priority Data
Feb. 1, 2016 (JP) .................................. 2016-017527

(51) Int. Cl.
*G01R 31/367* (2019.01)
*G01R 31/392* (2019.01)
(Continued)

(52) U.S. Cl.
CPC ......... *G01R 31/367* (2019.01); *G01R 31/389* (2019.01); *G01R 31/392* (2019.01);
(Continued)

(58) Field of Classification Search
CPC .. G01R 31/367; G01R 31/389; G01R 31/392; G06F 30/20; G06F 30/367;
(Continued)

(56) References Cited

U.S. PATENT DOCUMENTS

2015/0260800 A1  9/2015 Baba et al.
2015/0355283 A1* 12/2015 Lee ..................... G01R 31/3842
                                                    702/63
2016/0252585 A1  9/2016 Baba et al.

FOREIGN PATENT DOCUMENTS

JP          2013-152184 A     8/2013

OTHER PUBLICATIONS

Mar. 21, 2017 International Search Report issued in International Patent Application No. PCT/JP2017/001984.

* cited by examiner

*Primary Examiner* — Toan M Le
(74) *Attorney, Agent, or Firm* — Oliff PLC

(57) ABSTRACT

A battery model includes a series connection of a direct current resistance model, a charge transfer resistance model derived from the Butler-Volmer equation, and a diffusion resistance model. A battery state estimating device includes a storage unit and a parameter calculating unit. The storage unit stores information on the resistance parameter related to the resistance component of the diffusion resistance model, the time constant parameter related to the time constant of the diffusion resistance model, and the charge parameter of the charge transfer resistance model, in association with temperature information of the secondary battery. The parameter calculating unit calculates each of the parameters corresponding to the detected temperature value based on a detected temperature value of the secondary battery and the information stored in the storage unit. The parameter calculating unit sequentially identifies parameters used for
(Continued)

estimating the state using the Kalman filter and the calculated parameters as initial values.

13 Claims, 14 Drawing Sheets

(51) Int. Cl.
*H01M 10/42* (2006.01)
*H01M 10/48* (2006.01)
*G06F 30/20* (2020.01)
*G06F 30/367* (2020.01)
*G01R 31/389* (2019.01)
*G06F 111/10* (2020.01)
*G06F 119/06* (2020.01)

(52) U.S. Cl.
CPC ............ *G06F 30/20* (2020.01); *G06F 30/367* (2020.01); *H01M 10/425* (2013.01); *H01M 10/48* (2013.01); *G06F 2111/10* (2020.01); *G06F 2119/06* (2020.01)

(58) Field of Classification Search
CPC ............ G06F 2111/10; G06F 2111/06; H01M 10/425; H01M 10/48
See application file for complete search history.

$$CCV = OCV + V_s + V_{BV} + V_w$$

|  | R | τ |
|---|---|---|
| FIRST RC CIRCUIT | R1 = 0.0147/4 × Rd | τ1 = 1/3.5321 × τd |
| SECOND RC CIRCUIT | R2 = 0.0782/4 × Rd | τ2 = 1/2.3473 × τd |
| THIRD RC CIRCUIT | R3 = 0.3333/4 × Rd | τ3 = 1/1.0000 × τd |
| FOURTH RC CIRCUIT | R4 = 3.5738/4 × Rd | τ4 = 1/0.1206 × τd |

| | R | τ |
|---|---|---|
| FIRST RC CIRCUIT | R1 = 0.0331/3 × Rd | τ1 = 1/3.247 × τd |
| SECOND RC CIRCUIT | R2 = 0.2246/3 × Rd | τ2 = 1/1.555 × τd |
| THIRD RC CIRCUIT | R3 = 2.7415/3 × Rd | τ3 = 1/0.1981 × τd |

| | R | τ |
|---|---|---|
| FIRST RC CIRCUIT | R1 = 0.1056/2 × Rd | τ1 = 1/2.618 × τd |
| SECOND RC CIRCUIT | R2 = 1.8942/2 × Rd | τ2 = 1/0.382 × τd |

BATTERY STATE ESTIMATING DEVICE

CROSS REFERENCE TO RELATED APPLICATION

This application is the U.S. national phase of International Application No. PCT/JP2017/001984 filed Jan. 20, 2017 which designated the U.S. and claims priority to Japanese Patent Application No. 2016-17527 filed Feb. 1, 2016, the entire contents of which are hereby incorporated by reference.

TECHNICAL FIELD

The present disclosure relates to a battery state estimating device configured to estimate the state of a secondary battery based on a battery model of the secondary battery.

BACKGROUND ART

One known device of this kind, as disclosed in PTL 1, has a battery model of a secondary battery comprising a DC resistor and a series connection of a plurality of RC parallel circuits and sequentially identifies battery parameters which are the resistance component and capacitance component constituting the RC parallel circuits by the Unscented Kalman Filter (UKF).

CITATION LIST

Patent Literature

[PTL 1] JP 2014-74682 A

SUMMARY OF THE INVENTION

The battery model described in PTL 1 is not configured such that the characteristics of the current-voltage nonlinear region of the secondary battery can be expressed. This is because the nonlinear character of the current-voltage of the secondary battery becomes more dominant as the temperature of the secondary battery decreases, and especially in the region where the temperature is 0° C. or lower, the nonlinear character cannot be ignored. For this reason, according to the battery model described in PTL 1, the accuracy of the state estimation of the secondary battery may decrease at a low temperature of the secondary battery.

Further, according to the device described in PTL 1, when appropriate initial values are not set for the battery parameters, which are to be identified by the Kalman filter, for example, the solution may converge to a local solution which deviates greatly from the optimum solution, and thus there is a risk that the accuracy of the identification of the battery parameters deteriorates.

The main object of the present disclosure is to provide a battery state estimating device capable of avoiding decrease in the estimation accuracy of the state of the secondary battery when the temperature of the secondary battery is low and also avoiding decrease in the identification accuracy of the battery parameters constituting the battery model.

Means for solving the above-mentioned problem, and functions and effects thereof will be described below.

The present disclosure is a battery state estimating device configured to estimate a state of a secondary battery based on a battery model of the secondary battery. The battery model includes a series connection of a direct current resistance model representing a direct current resistance of the secondary battery, a charge transfer resistance model representing a charge transfer resistance of the secondary battery, the charge transfer resistance model including a charge parameter correlated with an exchange current density, the charge parameter being derived from the Butler-Volmer equation, and a diffusion resistance model representing a diffusion resistance of the secondary battery, the diffusion resistance model being at least one RC equivalent circuit model including a resistor and a capacitor. A parameter related to a resistance component of the diffusion resistance model is defined as a resistance parameter, and a parameter related to a time constant of the diffusion resistance model is defined as a time constant parameter.

The present disclosure further includes a storage unit in which information on the resistance parameter, the time constant parameter, and the charge parameter are stored in advance in association with temperature information of the secondary battery, a parameter calculating unit configured to calculate, based on a detected temperature value of the secondary battery and the information stored in the storage unit, the resistance parameter, the time constant parameter, and the charge parameter corresponding to the detected temperature value, and a state estimating unit configured to estimate a state of the secondary battery based on the resistance parameter, the time constant parameter, and the charge parameter calculated by the parameter calculating unit, and the parameter calculating unit includes an identifying unit configured to sequentially identify, with a Kalman filter and using the resistance parameter and the time constant parameter calculated by the parameter calculating unit as initial values, the resistance parameter and the time constant parameter used for estimating the state of the secondary battery in the state estimating unit.

The internal resistance of the secondary battery is roughly divided into direct current resistance, charge transfer resistance, and diffusion resistance. Thus, in the present embodiment, the battery model is configured to be a model comprising a series connection of a direct current resistance model, a charge transfer resistance model, and a diffusion resistance model.

When the temperature of the secondary battery is low, the nonlinear characteristic of current-voltage due to the charge transfer resistance becomes dominant. Thus, in the above disclosure, the charge transfer resistance model is configured to be a model derived from the Butler-Volmer equation of electrochemistry and expressing the nonlinear characteristics of the secondary battery. Specifically, this model includes a charge parameter which is a parameter corresponding to an exchange current density of the Butler-Volmer equation and is correlated with the temperature of the secondary battery. Since the charge parameter depends on the temperature of the secondary battery, it is possible to accurately represent the current-voltage nonlinear characteristics at low temperature using the charge parameter, which could not be expressed by the technique described in the above-mentioned PTL 1.

In the above disclosure, in addition to the information on the resistance parameter and the time constant parameter of the diffusion resistance model, information on the charge parameter is stored in the storage unit in advance in association with temperature information of the secondary battery. The parameter calculating unit calculates each of the resistance parameter, the time constant parameter, and the charge parameter that correspond to the detected temperature value based on a detected temperature value of the secondary battery and the information stored in the storage unit. The state estimating unit estimates the state of the secondary battery based on the calculated resistance parameter, time constant parameter, and charge parameter. According to the above disclosure which uses the charge parameter, it is possible to prevent the estimation accuracy of the state of the secondary battery from decreasing when the temperature of the secondary battery is low.

The resistance parameter and the time constant parameter may change due to deterioration of the secondary battery, may deviate from an appropriate value due to the model error of the diffusion resistance model, or may differ due to the differences between individual secondary batteries. In such a case, the accuracy of the state estimation of the secondary battery based on the battery model may decrease.

Therefore, the above disclosure is provided with an identifying unit for sequentially identifying the resistance parameter and the time constant parameter with the Kalman filter. However, when appropriate initial values are not set for the identification of the resistance parameter and the time constant parameter by the Kalman filter, for example, the solution may converge to a local solution which deviates greatly from the optimum solution, and thus there is a risk that the accuracy of the identification of the resistance parameter and the time constant parameter deteriorates. The resistance parameter and the time constant parameter determined from the information stored in advance in the storage unit are not greatly deviated from the current (present time) resistance parameter and time constant parameter corresponding to the current temperature of the secondary battery. Thus, the resistance parameter and the time constant parameter determined from the information stored in the storage unit in advance are appropriate values as the initial values used with the Kalman filter.

Therefore, the identifying unit of the above disclosure sequentially identifies the resistance parameter and the time constant parameter with the Kalman filter using, as initial values, a resistance parameter and a time constant parameter calculated based on the information stored in the storage unit in advance. This makes it possible to appropriately set the initial values used with the Kalman filter, and thus reduces the risk that the appropriate solution cannot be found, such as the solution converging to a local solution. As a result, it is possible to avoid decrease in the identification accuracy of the resistance parameter and the time constant parameter, and thus to avoid decrease in the estimation accuracy of the state of the secondary battery.

BRIEF DESCRIPTION OF THE DRAWINGS

The above and other objects, features, and advantages of the present disclosure will become clearer from the following detailed description with reference to the accompanying drawings. In the drawings.

FIG. 19 is a diagram showing that a first correction coefficient Rk has changed due to battery deterioration or the like;

DESCRIPTION OF THE EMBODIMENTS

First Embodiment

A first embodiment of a battery state estimating device according to the present disclosure will be described below with reference to the drawings. In the present embodiment, the battery state estimating device is applied to a vehicle.

Figure 1:
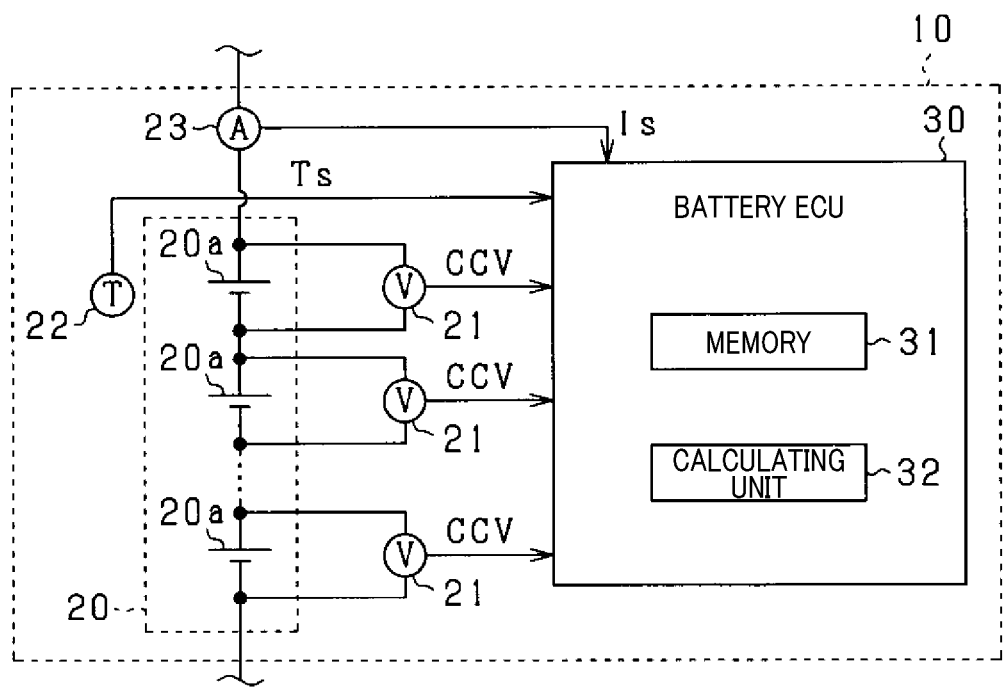
FIG. 1 is a configuration diagram of a vehicle-mounted battery pack according to a first embodiment.

As shown in FIG. 1, a battery pack 10 is mounted on a vehicle and includes a battery pack 20 and a battery ECU 30. The battery pack 20 is composed of a series connection of a plurality of battery cells 20a. In the present embodiment, the vehicle is assumed to be a vehicle equipped with a rotating electrical machine as its main engine, specifically, for example, a hybrid vehicle or an electric vehicle. The battery pack 20 exchanges electric power with the rotating electric machine or the like. The battery cells 20a are secondary batteries, and in the present embodiment, lithium ion secondary batteries are used. Note that the vehicle is not limited to a vehicle having a rotating electric machine as its main engine, but may be a vehicle that utilizes an in-vehicle auxiliary machinery battery such as an idling stop system.

The battery pack 10 includes a voltage sensor 21, a temperature sensor 22, and a current sensor 23. The voltage sensor 21 is a voltage detecting unit for detecting the voltage between terminals of each battery cell 20a. The temperature sensor 22 is a temperature detecting unit for detecting the temperature of the battery pack 20. In the present embodiment, the temperature sensor 22 detects the temperature of each battery cell 20a. The current sensor 23 is a current detecting unit for detecting the charging/discharging current flowing through each battery cell 20a. Hereinafter, the current detected by the current sensor 23 will be referred to as a detected current Is, and the temperature detected by the temperature sensor 22 will be referred to as a detected temperature Ts. Further, the voltage detected by the voltage sensor 21 will be referred to as a detected voltage CCV.

The battery ECU 30 is configured as a computer including a CPU, a memory 31 as a storage unit, and an I/O (not shown), etc. The CPU includes calculating units 32 respectively corresponding to the battery cells 20a. The battery ECU 30 receives detected values from the voltage sensor 21, the temperature sensor 22, and the current sensor 23. The memory 31 may be, for example, EEPROM.

Figure 2:
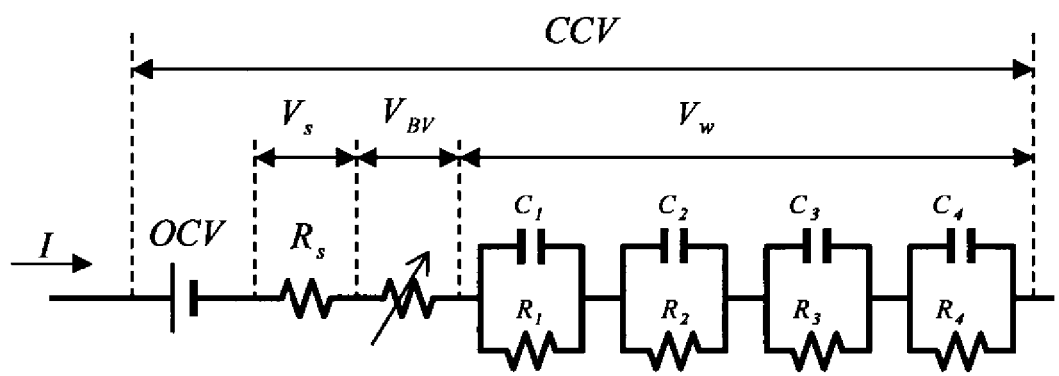
FIG. 2 is a diagram showing a battery model.

The calculating unit 32 performs various arithmetic processes based on a battery model of the battery cells 20a. Before explaining the arithmetic processes, the battery model according to the present embodiment will be described with reference to FIG. 2. FIG. 2 shows a battery model expressing an internal impedance and the like. In the present embodiment, the battery model is basically represented as a series connection of an open circuit voltage OCV, a DC resistance model, a charge transfer resistance model, and a diffusion resistance model. In FIG. 2, Rs denotes a direct current resistance representing a conductive resistance in a solution or electrodes, and Vs denotes a potential difference in a direct current resistance Rs (hereinafter referred to as a direct current resistance voltage). VBV denotes a potential difference in a charge transfer resistance representing an electrode interface reaction at a positive electrode and a negative electrode (hereinafter referred to as a charge transfer resistance voltage). R1 to R4 denote resistance values of resistance component terms in a diffusion resistance representing an ion diffusion in an active material or the solution, C1 to C4 denote capacitances of capacitance component terms for representing a change in a resistance over time, and Vw denotes a polarization voltage in the diffusion resistance.

In the present embodiment, a model including a series connection of a plurality of RC parallel circuits is used as the diffusion resistance model, specifically, a model including a series connection of four RC parallel circuits is used. Further, in the present embodiment, the charge transfer resistance model shown in FIG. 2 is expressed only by direct current resistance for the sake of convenience, and the time constant in the model is ignored. This is because one calculation cycle of the calculating unit 32 is set to be sufficiently longer than the time constant of the charge transfer resistance in the present embodiment.

Next, the calculating unit 32 will be explained.

Figure 3:
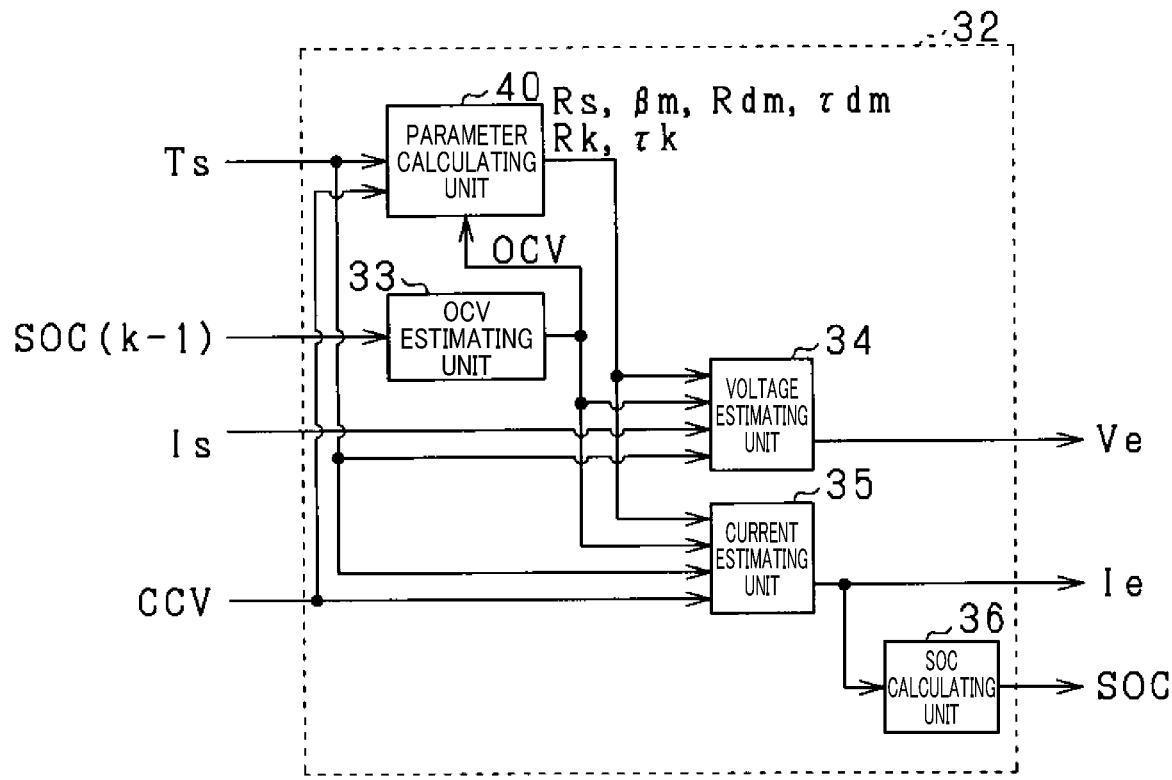
FIG. 3 is a block diagram showing a process of a calculating unit.
Figure 4:
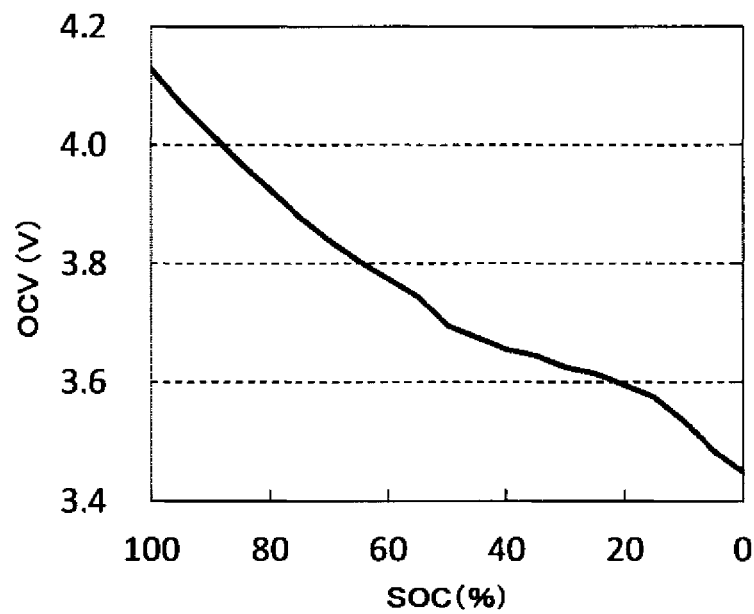
FIG. 4 is a diagram showing an OCV map that defines a relationship between a SOC and an open circuit voltage OCV.

As shown in FIG. 3, the calculating unit 32 includes an OCV estimating unit 33. The OCV estimating unit 33 calculates the open circuit voltage OCV of the battery cell 20a based on a state of charge (SOC) of the battery cell 20a in a previous calculation cycle calculated by a SOC calculating unit 36 described later. In the present embodiment, for example, as shown in FIG. 4, the OCV estimating unit 33 calculates the open circuit voltage OCV using an OCV map in which the SOC and the open circuit voltage OCV are related in advance. In the present embodiment, the OCV map is stored in the memory 31. Note that the reason that the SOC (k−1) in the previous computation cycle may be used in the OCV estimating unit 33 is because the amount of change in the SOC in one computation cycle is very small.

Figure 5:
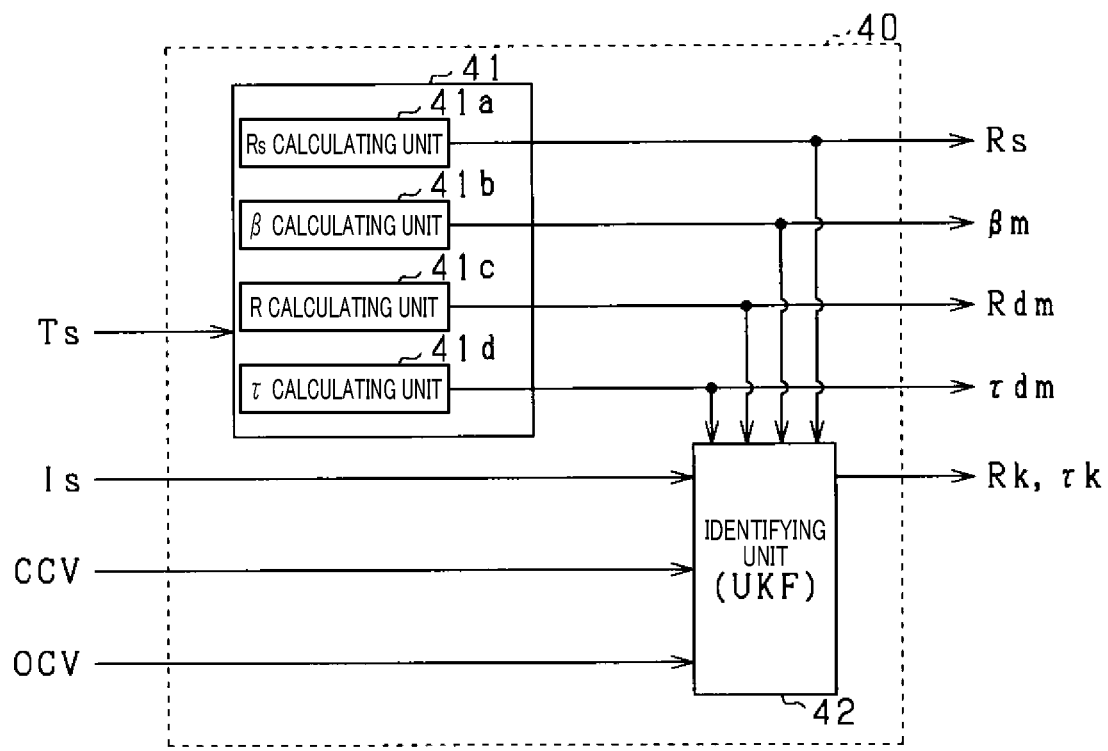
FIG. 5 is a block diagram showing a process of a parameter calculating unit.

The calculating unit 32 includes a parameter calculating unit 40. As shown in FIG. 5, the parameter calculating unit 40 includes an initial value calculating unit 41. The initial value calculating unit 41 includes an Rs calculating unit 41a. Based on a detected temperature Ts, the Rs calculating unit 41a calculates a direct current resistance Rs for calculating the DC resistance voltage Vs expressed by the following equation (eq 1).

[Eq. 1]

$$Vs = Rs \cdot I \qquad (eq\ 1)$$

Figure 6:
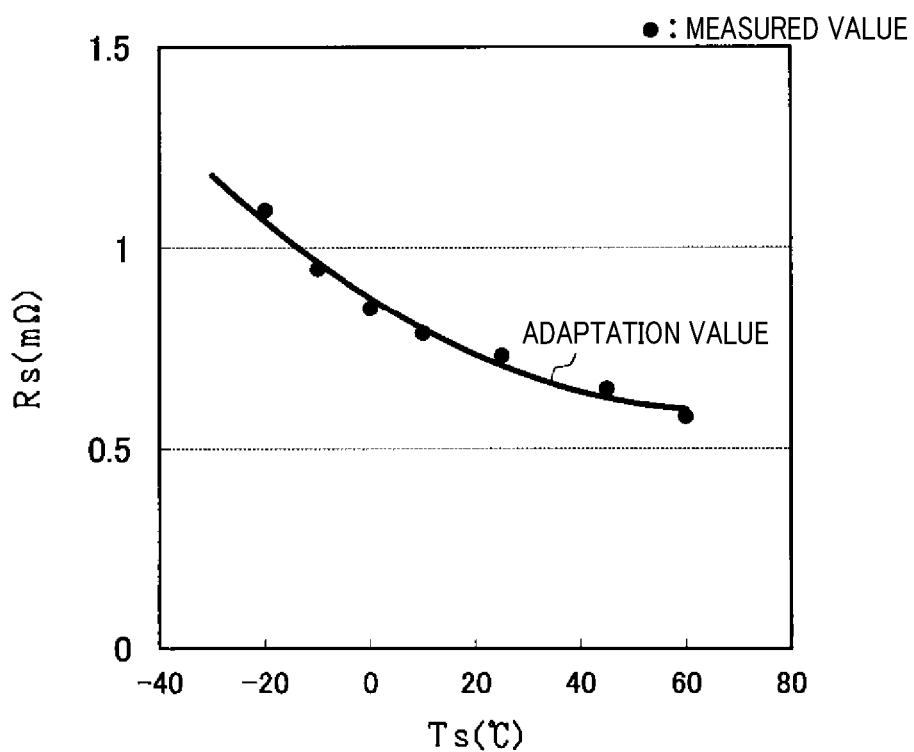
FIG. 6 is a diagram showing an Rs map that defines a relationship between a direct current resistance and a battery temperature.

In the above equation (eq 1), I represents a current flowing through the battery cell 20a. In the present embodiment, the Rs calculating unit 41a calculates the direct current resistance Rs by using an Rs map in which the direct current resistance Rs and the detected temperature Ts are related in advance. The Rs map is stored in the memory 31, and as shown in FIG. 6, for example, the higher the detected temperature Ts, the lower the direct current resistance Rs. Note that the Rs map may be created by measuring the direct current resistance Rs using an impedance analyzer, for example.

The initial value calculating unit 41 includes a β calculating unit 41b. The β calculating unit 41b calculates a charge parameter βm which constitutes a charge transfer resistance model based on the detected temperature Ts. Hereinafter, the charge transfer resistance model will be described.

The Butler-Volmer equation in electrochemistry is represented by the following equation (eq 2).

[Eq. 2]

$$i = io\left\{\exp\left(\frac{a_s NF\eta}{R_a T}\right) - \exp\left(\frac{-(1-a_s)NF\eta}{R_a T}\right)\right\} \qquad (eq\ 2)$$

In the above equation (eq 2), i represents a current density, io represents an exchange current density, αs represents a transfer coefficient of an electrode reaction (specifically, oxidation reaction), N represents the number of charges, F represents the Faraday constant, η represents an overvoltage, Ra represents a gas constant, and T represents the temperature (absolute temperature) of the battery cell.

In the above equation (eq 2), assuming that the positive and negative electrodes are equivalent for simplicity, that is, a charging efficiency and a discharging efficiency are the same (a=αs=1−αs), the above equation (eq 2) can be transformed into the following equation (eq 3).

[Eq. 3]

$$i = io\left\{\exp\left(\frac{aNF\eta}{R_aT}\right) - \exp\left(\frac{-aNF\eta}{R_aT}\right)\right\} \quad (eq3)$$

Using a relationship between a hyperbolic sine function and an exponential function, the above equation (eq 3) is transformed into the following equation (eq 4).

[Eq. 4]

$$i = 2 \cdot io \cdot \sinh\left(\frac{aNF\eta}{R_aT}\right) \quad (eq4)$$

Solving the above equation (eq 4) for the overvoltage η, the following equation (eq 5) is obtained.

[Eq. 5]

$$\eta = \frac{R_aT}{aNF}\sinh^{-1}\left(\frac{1}{2 \cdot io}i\right) \quad (eq5)$$

Meanwhile, a relationship between the overvoltage η and a charge transfer resistance voltage VBV is expressed by the following equation (eq 6) using an adaptation coefficient γ which is a proportionality coefficient. In addition, a relationship between the current density i and the current I flowing through the battery cell is expressed by the following equation (eq 7) using the adaptation coefficient γ.

[Eq. 6]

$$\eta = \gamma \cdot V_{BV} \quad (eq\ 6)$$

[Eq. 7]

$$i = \gamma \cdot I \quad (eq\ 7)$$

Substituting the above equations (eq 6) and (eq 7) into the above equation (eq 5), the following equation (eq 8) is derived.

[Eq. 8]

$$\gamma \cdot V_{BV} = \frac{R_aT}{aNF}\sinh^{-1}\left(\frac{1}{2 \cdot io}\gamma \cdot I\right) \quad (eq8)$$

The above equation (eq 8) is sorted into the following equation (eq 9).

[Eq. 9]

$$V_{BV} = \frac{a}{\gamma}T \cdot \sinh^{-1}(\gamma \cdot \beta \cdot I) \quad (eq9)$$

where $$\alpha = \frac{R_a}{aNF}, \beta = \frac{1}{2 \cdot io}$$

In the above equation (eq 9), β represents a charge parameter, and α represents a physical constant. The above equation (eq 9) shows that it is possible to relate the current I flowing through the battery cell and the charge transfer resistance voltage VBV using the charge parameter β. Specifically, in an inverse hyperbolic sine function in which the current flowing through the battery cell is an independent variable and the charge transfer resistance voltage VBV is a dependent variable, the charge parameter β derived from the Butler-Volmer equation serves as a coefficient that determines a relationship between the inverse hyperbolic sine function and the charge transfer resistance voltage VBV.

The exchange current density io follows the following equation (eq 10) with respect to the absolute temperature. In the following equation (eq 10), Kb and is represent constants. The constant Kb can also be described as Kb=E/Ra by using an activation energy E and the gas constant Ra.

[Eq. 10]

$$io = i_a \cdot \exp\left(-\frac{K_b}{T}\right) \quad (eq10)$$

Thus, the temperature characteristics of the charge parameter β can be expressed by the following equation (eq 11).

[Eq. 11]

$$\beta \propto \frac{1}{io} \propto \beta_0 \cdot \exp\left(\frac{K_b}{T}\right) \quad (eq11)$$

In the present embodiment, the memory 31 is provided in advance with a β map adapted such that the natural logarithm of the charge parameter β is expressed in the form of a linear equation with respect to a reciprocal of the detected temperature Ts, according to the Arrhenius plot represented by the following equation (eq 12) obtained by taking the logarithm of both sides of the above equation (eq 11). Hereinafter, a charge parameter stored in the memory 31 is denoted as βm.

[Eq. 12]

$$\ln(\beta_m) = \ln(\beta_0) + \frac{K_b}{T} \quad (eq12)$$

Figure 7:
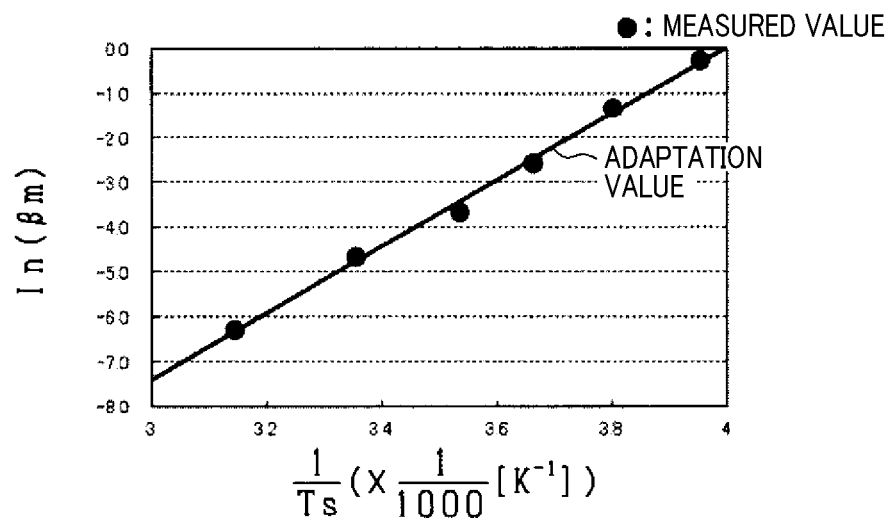
FIG. 7 is a diagram showing a β map that defines a relationship between a charge parameter and the battery temperature.

FIG. 7 shows a β map. A slope of a linear equation of FIG. 7 is a constant Kb, and a Y intercept is ln(β0). The β calculating unit 41b calculates the natural logarithm of the charge parameter ln(βm) based on the detected temperature Ts and the β map. The β calculating unit 41b calculates the charge parameter βm by converting the calculated natural logarithm ln(βm) into an exponential function. Thus, it is possible to accurately set the initial value of the charge parameter βm at the time of activation of the battery ECU 30. In the above equation (eq 12), Kb represents a constant determined by a physical constant. Therefore, the slope of the linear equation in FIG. 7 does not change before and after degradation of the battery cell or the like.

Figure 8:
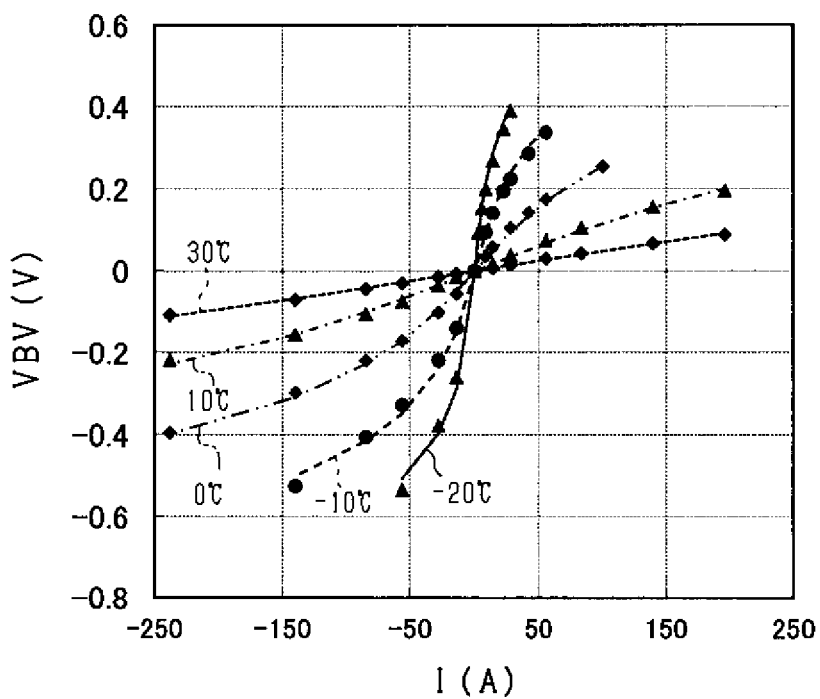
FIG. 8 is a diagram showing a temperature dependency of a current-voltage characteristic of a charge transfer resistance.

It should be noted that, as shown in FIG. 8, the above equation (eq 9) is an equation in which the charge transfer resistance voltage VBV becomes nonlinear with respect to the current I at low temperature. When the temperature of the battery cell is low, using the charge parameter β, it is possible to calculate the charge transfer resistance voltage VBV which accurately represents the current-voltage non-linear characteristics.

Figure 9:
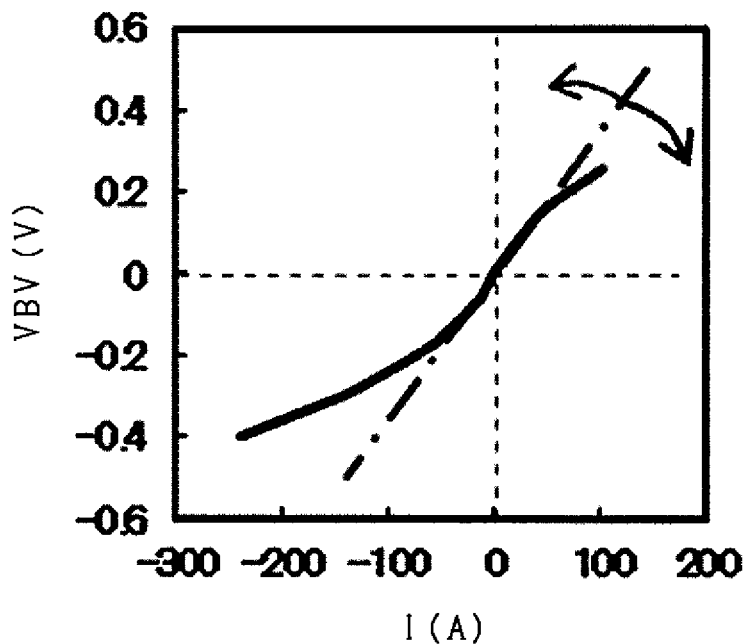
FIG. 9 is a diagram showing a Butler-Volmer equation and an approximation near 0 A.
Figure 10:
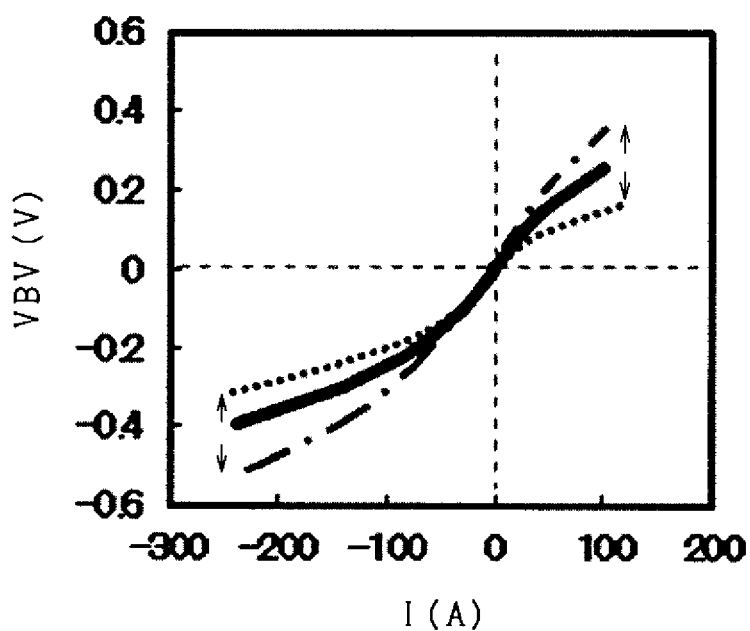
FIG. 10 is a diagram showing a relationship between the Butler-Volmer equation and an adaptation coefficient.

As shown in FIG. 9, the charge parameter β is a parameter that determines the slope of the charge transfer resistance voltage VBV with respect to the current I in the vicinity of current I=0 A. Further, the adaptation coefficient γ of the above equation (eq 9) is a proportionality coefficient that defines the relationship between the charge transfer resistance voltage VBV and the current I flowing through the battery cell. By changing the adaptation coefficient γ, it is possible to adapt the charge transfer resistance voltage VBV in a region where the current I is large as shown in FIG. 10 without changing the slope in the vicinity of current I=0 A. In the present embodiment, the adaptation coefficient γ is set to a fixed value. An adaptation coefficient γc for when the battery cell 20a is being charged may be set separately from an adaptation coefficient γd for when the battery cell 20a is being discharged. For example, the adaptation coefficient γc for charging may be 0.25, and the adaptation coefficient γd for discharging may be 0.14.

Returning to the explanation of FIG. 5, the initial value calculating unit 41 includes an R calculating unit 41c and a τ calculating unit 41d which calculate parameters constituting the diffusion resistance model. The diffusion resistance model according to the present embodiment will be described.

Figure 11:
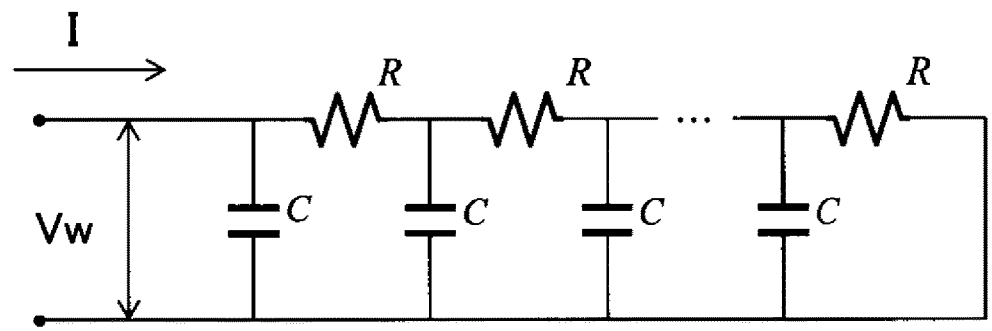
FIG. 11 is a diagram showing a ladder circuit.
Figure 12:
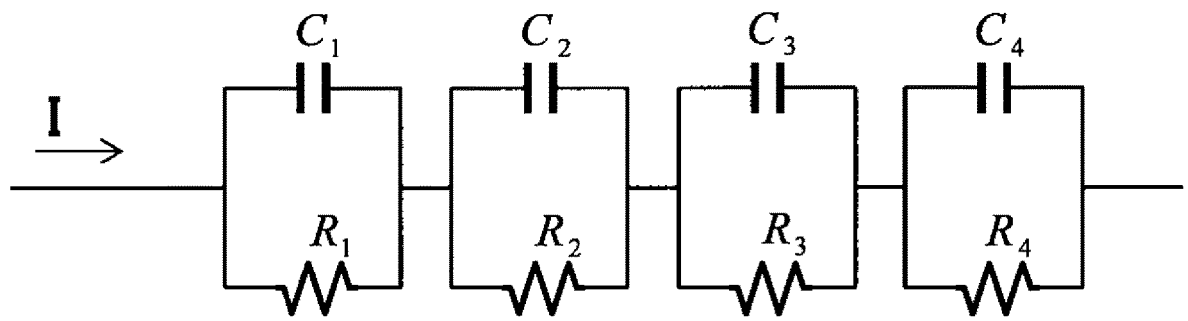
FIG. 12 is a diagram showing a Foster-type RC equivalent circuit.

In the present embodiment, as shown in FIG. 11, the diffusion resistance model is derived based on a ladder circuit derived from a transmission line circuit model. Specifically, as shown in FIG. 12, the diffusion resistance model used is a model obtained by converting a ladder circuit, and is a Foster-type equivalent circuit model including a series connection of a plurality of (four) RC parallel circuits. Resistance values R of resistors of the ladder circuit are the same, and electrostatic capacities C of capacitors are the same.

Figure 13:
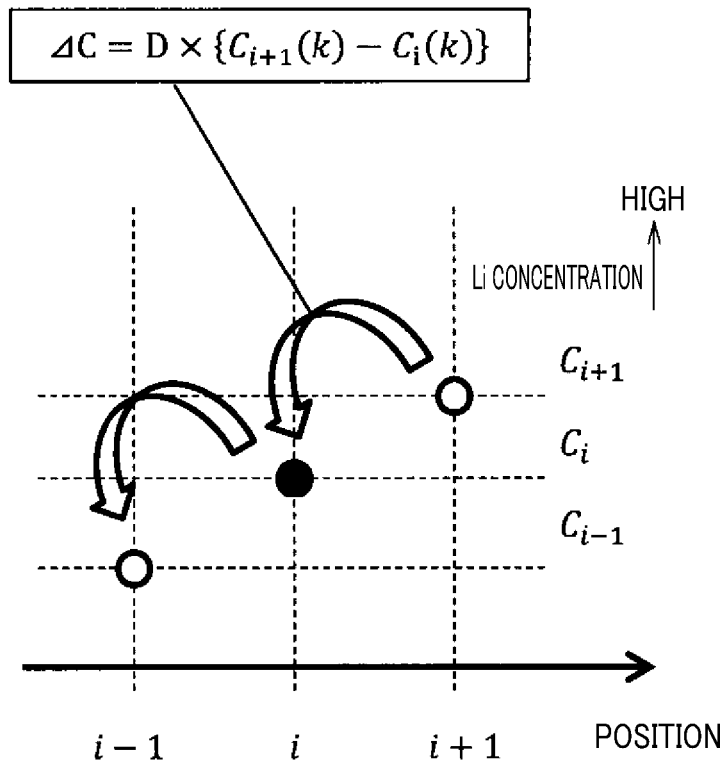
FIG. 13 is a diagram for explaining an outline of a diffusion phenomenon.

The reason that the equivalent circuit model based on a ladder circuit can simulate the diffusion phenomenon will be explained. The diffusion phenomenon of a battery can be explained based on a diffusion equation. As shown in FIG. 13, depending on a concentration difference between a concentration Ci at a position i in an active material of the battery cell and a concentration C(i+1) at a position i+1, the active material moves from the high concentration position i+1 to the low concentration position. An amount of movement ΔC of the active material is represented by the following expression (eq 13) using a diffusion coefficient D.

[Eq. 13]

$$\Delta C = D \times \{C_{i+1}(k) - C_i(k)\} \quad (\text{eq 13})$$

Figure 14:
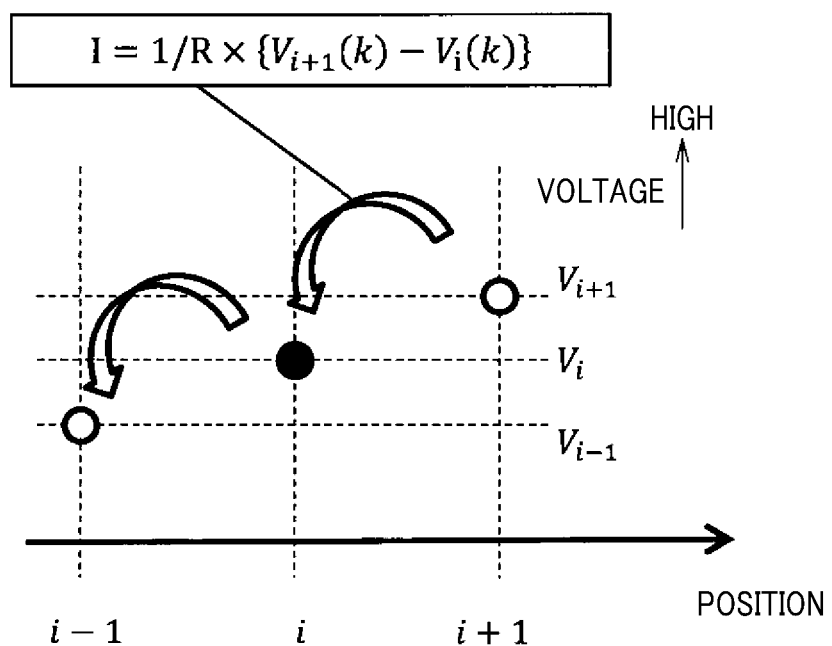
FIG. 14 is a diagram for explaining that an equivalent circuit model based on a ladder circuit can simulate the diffusion phenomenon.

On the other hand, when the diffusion phenomenon is expressed by using a ladder circuit and the Kirchhoff's rule, as shown in FIG. 14, it is possible to replace the concentration with a potential difference V of the capacitor C and the amount of movement ΔC with the current I. Thus, the diffusion phenomenon can be simulated by a ladder circuit based on a transmission line circuit model. That is, in this case, the following equation (eq 14) is satisfied.

[Eq. 14]

$$I = \frac{1}{R} \times \{V_{i+1}(k) - V_i(k)\} \quad (\text{eq 14})$$

According to the above equations (eq 13) and (eq 14), the current I flowing through the resistor R is proportional to the potential difference of the capacitor C adjacent to the resistor R. The proportionality coefficient becomes 1/R, and the relationship of $1/R \propto$ (proportional to) D is satisfied.

Now, a conversion of the ladder circuit to a Foster type equivalent circuit will be explained. The Warburg impedance represented by the ladder circuit is expressed by the following equation (eq 15).

[Eq. 15]

$$Zw(s) = \cfrac{1}{sC + \cfrac{1}{R + \cfrac{1}{sC + \cfrac{1}{R + \cfrac{1}{sC + \cfrac{1}{R + \cfrac{1}{sC + \cfrac{1}{R}}}}}}}}$$

$$= \frac{R^4 C^3 s^3 + 6R^3 C^2 s^2 + 10R^2 Cs + 4R}{R^4 C^4 s^4 + 7R^3 C^3 s^3 + 15R^2 C^2 s^2 + 10RCs + 1} \quad (\text{eq 15})$$

In the above equation (eq 15), s represents the Laplace operator, C represents the capacitance of the capacitor of the ladder circuit, and R represents the resistance value of the resistance of the ladder circuit. Performing partial fraction decomposition of the above equation (eq 15), the following equation (eq 16) is derived.

Figures 15, 16:
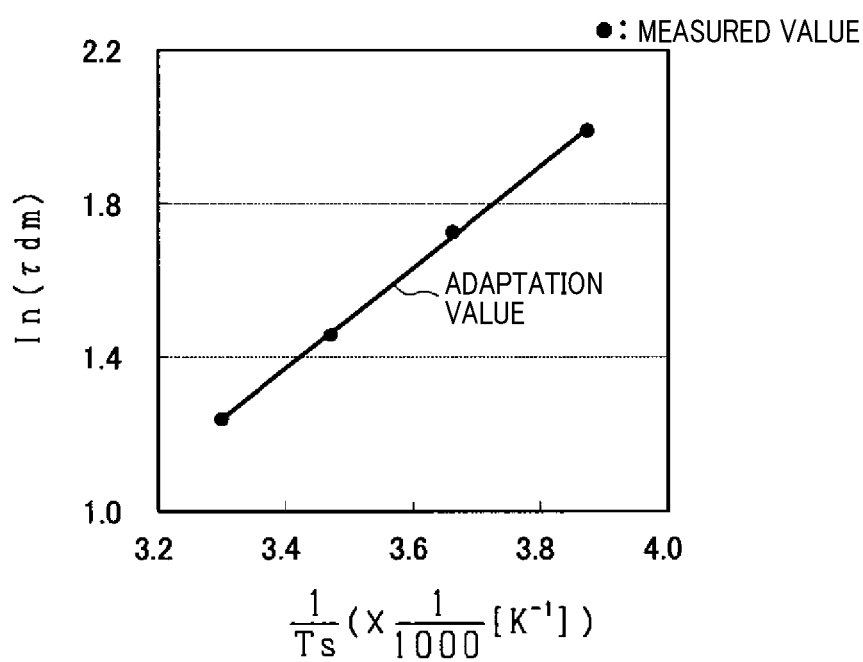
FIG. 15 is a diagram showing a conversion table that defines a relationship of a resistance parameter Rd and a time constant parameter τd with resistance values R1 to R4 and time constants τ1 to τ4.
FIG. 16 is a diagram showing a τd map that defines a relationship between the time constant parameter and the battery temperature.

[Eq. 16]

$$Zw(s) \cong \frac{0.052R}{RCs + 3.5321} + \frac{0.1836R}{RCs + 2.3473} + \frac{0.3333R}{RCs + 1} + \frac{0.431R}{RCs + 0.1206}$$

$$= \frac{0.0147R}{\frac{RC}{3.5321}s + 1} + \frac{0.0782R}{\frac{RC}{2.3473}s + 1} + \frac{0.3333R}{RCs + 1} + \frac{3.5738R}{\frac{RC}{0.1206}s + 1}$$

$$= \frac{R_1}{\tau_1 s + 1} + \frac{R_2}{\tau_2 s + 1} + \frac{R_3}{\tau_3 s + 1} + \frac{R_4}{\tau_4 s + 1} \quad (\text{eq 16})$$

where
$R_1 = 0.0147R$,
$R_2 = 0.0782R$,
$R_3 = 0.3333R$,
$R_4 = 3.5738R$
$\tau_1 = \frac{\tau_d}{3.5321}$,
$\tau_2 = \frac{\tau_d}{2.3473}$,
$\tau_3 = \frac{\tau_d}{1.0000}$,
$\tau_4 = \frac{\tau_d}{0.1206}$,
$\tau_d = RC$ In the above equation (eq 16), τ1, τ2, τ3, τ4 correspond to R1×C1, R2×C2, R3×C3, R4×C4 which are parameters of the respective RC parallel circuits shown in FIG. 12. In the present embodiment, τd in the above equation (eq 16) is referred to as a time constant parameter. The relationship between each time constant τ1 to τ4 and the time constant parameter τd is as shown in FIG. 15. Each of the time constants τ1 to τ4 can be set based on the coefficients 1/3.5321.1/2.3473, 1/1.0000, 1/0.1206 respectively corresponding to the RC parallel circuits shown in FIG. 12 and the common time constant parameter τd.

On the other hand, in the present embodiment, four RC parallel circuits shown in FIG. 12 are used. Thus, when a resistance parameter Rd satisfying the relationship of 4×R=Rd is defined, the relationship between the resistance values R1 to R4 and the resistance parameter Rd becomes as shown in FIG. 15. The resistance values R1 to R4 can be set based on coefficients respectively corresponding to the RC parallel circuits shown in FIG. 12 and the common resistance parameter Rd.

The resistance parameter Rd and the time constant parameter τd depend on the detected temperature Ts as shown in the following equations (eq 17) and (eq 18). In the following equations (eq 17) and (eq 18), R0, Kr, T0, and Kt represent constants.

[Eq. 17]

$$R_d = R_0 \cdot \exp\left(\frac{K_r}{T_s}\right) \tag{eq17}$$

[Eq. 18]

$$\tau_d = \tau_0 \cdot \exp\left(\frac{K_t}{T_s}\right) \tag{eq18}$$

In the present embodiment, the memory 31 is provided in advance with a Rd map adapted such that the natural logarithm of the resistance parameter Rd is expressed in the form of a linear equation with respect to the reciprocal of the detected temperature Ts, according to the Arrhenius plot represented by the following equation (eq 19) obtained by taking the logarithm of both sides of the above equation (eq 17). Hereinafter, a resistance parameter stored in the memory 31 is denoted as Rdm.

[Eq. 19]

$$\ln(R_{dm}) = \ln(R_0) + \frac{K_r}{T_s} \tag{eq19}$$

Figure 17:
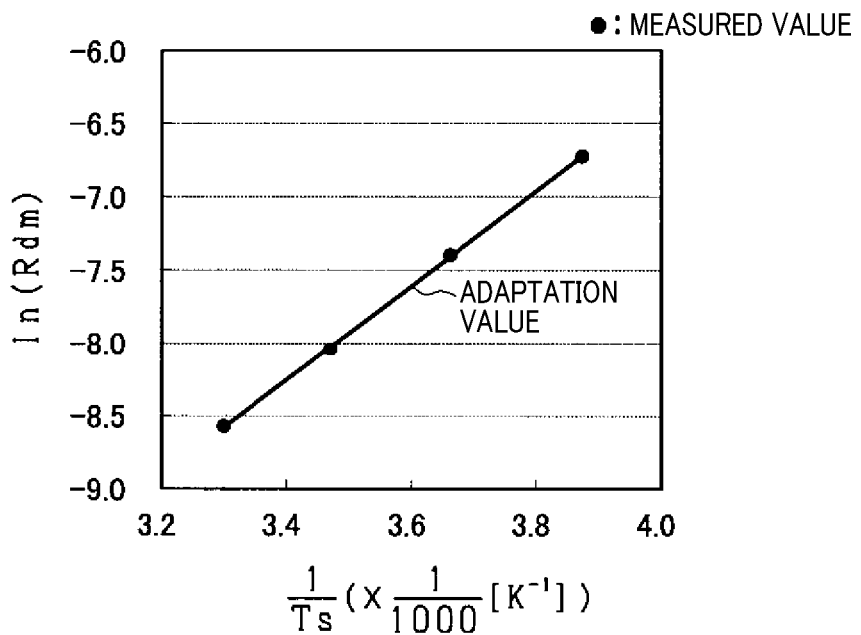
FIG. 17 is a diagram showing an Rd map that defines a relationship between the resistance parameter and the battery temperature.

FIG. 17 shows a Rd map. A slope of a linear equation of FIG. 17 is a constant Kr, and a Y intercept is ln(R0). The R calculating unit 41c calculates the natural logarithm of the resistance parameter Rdm based on the detected temperature Ts and the Rd map. The R calculating unit 41c calculates the resistance parameter Rdm by converting the calculated natural logarithm ln(Rdm) into an exponential function. Thus, it is possible to accurately set the initial value of the resistance parameter Rdm at the time of activation of the battery ECU 30. In the above equation (eq 19), Kr represents a constant determined by physical constants. Therefore, the slope of the linear equation in FIG. 17 does not change before and after degradation of the battery cell or the like.

Further, in the present embodiment, the memory 31 is provided in advance with a τd map adapted such that the natural logarithm of the time constant parameter τd is expressed in the form of a linear equation with respect to the reciprocal of the detected temperature Ts, according to the Arrhenius plot represented by the following equation (eq 20) obtained by taking the logarithm of both sides of the above equation (eq 18). Hereinafter, a time constant parameter stored in the memory 31 is denoted as τdm.

[Eq. 20]

$$\ln(\tau_{dm}) = \ln(\tau_0) + K_t \times \frac{1}{T_s} \tag{eq20}$$

FIG. 16 shows a τd map. A slope of a linear equation of FIG. 16 is a constant Kt, and a Y intercept is ln(τ0). The τ calculating unit 41d calculates the natural logarithm of the time constant parameter τdm based on the detected temperature Ts and the τd map. The τ calculating unit 41d calculates the time constant parameter τdm by converting the calculated natural logarithm ln(τdm) into an exponential function. Thus, it is possible to correctly set the initial value of the time constant parameter τdm at the time of activation of the battery ECU 30. In the above equation (eq 20), Kt represents a constant determined by physical constants. Therefore, the slope of the linear equation in FIG. 16 does not change before and after degradation of the battery cell or the like.

Returning to the explanation of FIG. 5, the identifying unit 42 sequentially identifies a first correction coefficient Rk for correcting the resistance parameter Rdm and a second correction coefficient τk for correcting the time constant parameter τdm using the Unscented Kalman filter (UKF). The first correction coefficient Rk is a parameter showing the relationship of the following equation (eq 21). In the following equation (eq 21), Rdc represents a corrected resistance parameter. In the present embodiment, an initial value of the first correction coefficient Rk is set to 1, and this value is stored in the memory 31 in advance.

[Eq. 21]

$$R_{dc} = R_k \times R_{dm} \tag{eq 21}$$

The second correction coefficient τk is a parameter satisfying the following equation (eq 22). In the following equation (eq 22), τdc represents a corrected time constant parameter. In the present embodiment, an initial value of the second correction coefficient τk is set to 1, and this value is stored in the memory 31 in advance.

[Eq. 22]

$$\tau_{dc} = \tau_k \times \tau_{dm} \tag{eq 22}$$

The correction coefficients Rk and τk identified by the identifying unit 42 are sequentially stored in the memory 31. The identifying unit 42 will be discussed below in more detail. In the present embodiment, the identifying unit 42 corresponds to a first processing unit and a second processing unit.

Returning to the explanation of FIG. 3, the calculating unit 32 includes a voltage estimating unit 34. As shown in the following equation (eq 23), the voltage estimating unit 34 calculates an estimated voltage Ve(k), which is an estimation of an inter-terminal voltage of the battery cell 20a, by adding up an open circuit voltage OCV(k) of the current calculation cycle estimated by the OCV estimating unit 33, a direct current voltage resistance Vs(k) of the current calculation cycle, a charge transfer resistance voltage VBV(k) of the current calculation cycle, and a polarization voltage Vw(k) of the current calculation cycle.

[Eq. 23]

$$V_e(k) = OCV(k) + V_s(k) + V_{BV}(k) + V_w(k) \quad (eq\ 23)$$

In the above equation (eq 23), the direct current resistance voltage Vs(k) is calculated by multiplying the direct current resistance Rs calculated by the parameter calculating unit 40 by the detected current Is(k) of the current calculation cycle, as shown in the above equation (eq 1). Further, the charge transfer resistance voltage VBV(k) is calculated by substituting the charge parameter βm calculated by the parameter calculating unit 40, the detected current Is(k) and the detected temperature Ts(k) into the above equation (eq 9).

Furthermore, in the above equation (eq 23), the polarization voltage Vw(k) is calculated as follows. Specifically, first, the corrected resistance parameter Rdc shown in the above equation (eq 21) is calculated by multiplying the resistance parameter Rdm calculated by the R calculating unit 41c by the first correction coefficient Rk identified by the identifying unit 42. Then, by inputting the calculated corrected resistance parameter Rdc to Rd shown in FIG. 15, the resistance values R1 to R4 are calculated.

Further, the corrected time constant parameter τdc shown in the above equation (eq 22) is calculated by multiplying the time constant parameter τdm calculated by the τ calculating unit 41d by the second correction coefficient τk identified by the identifying unit 42. Then, by inputting the calculated corrected time constant parameter τdc to τd shown in FIG. 15, the time constants τ1 to τ4 are calculated.

The polarization voltage Vw(k) is calculated based on the calculated resistance values R1 to R4, the time constants τ1 to τ4, the detected current Is(k) of the current calculation cycle, and the detected current Is(k−1) of the previous calculation cycle from the following equation (eq 24).

[Eq. 24]

$$V_w(k) = V_1(k) + V_2(k) + V_3(k) + V_4(k) \quad (eq24)$$

where $$V_1(k) = \frac{2\tau_1 - dT}{2\tau_1 + dT} V_1(k-1) + \frac{R_1 \times dT}{2\tau_1 + dT}(I_s(k) + I_s(k-1))$$

$$V_2(k) = \frac{2\tau_2 - dT}{2\tau_2 + dT} V_1(k-1) + \frac{R_2 \times dT}{2\tau_2 + dT}(I_s(k) + I_s(k-1))$$

$$V_3(k) = \frac{2\tau_3 - dT}{2\tau_3 + dT} V_1(k-1) + \frac{R_3 \times dT}{2\tau_3 + dT}(I_s(k) + I_s(k-1))$$

$$V_4(k) = \frac{2\tau_4 - dT}{2\tau_4 + dT} V_1(k-1) + \frac{R_4 \times dT}{2\tau_4 + dT}(I_s(k) + I_s(k-1))$$

Note that V1 to V4 in the above equation (eq 24) are equations obtained by discretizing the transfer function of the RC parallel circuit shown in FIG. 12 by bilinear transformation, and dT indicates one calculation cycle of the calculating unit 32. Further, (k) of each parameter indicates that the value is that of the current calculation cycle, and (k−1) indicates that the value is that of the previous calculation cycle. The above equation (eq 24) may be discretized by the backward Euler method or the like for simplicity.

Returning to the explanation of FIG. 3, the calculating unit 32 includes a current estimating unit 35. The current estimating unit 35 calculates an estimated current Ie(k) which is an estimation of the current flowing through the battery cell 20a. In the present embodiment, since the battery model includes the nonlinear equation represented by the above equation (eq 9), it is impossible to directly estimate the current from the voltage. Therefore, in the present embodiment, the estimated current Ie(k) is calculated using a search method. In the present embodiment, a bisection method is used as the search method.

Specifically, the current estimating unit 35 calculates the target voltage Vtgt based on the following equation (eq 25).

[Eq. 25]

$$V_{tgt} = CCV(k) - OCV(k) - V_w(k) \quad (eq\ 25)$$

In the above equation (eq 25), the detected voltage CCV(k) of the current calculation cycle and the open circuit voltage OCV calculated by the OCV estimating unit 33 are used. Further, the polarization voltage Vw(k) in the above equation (eq 25) is calculated by a method similar to the calculation method of the polarization voltage at the voltage estimating unit 34.

Figure 18:
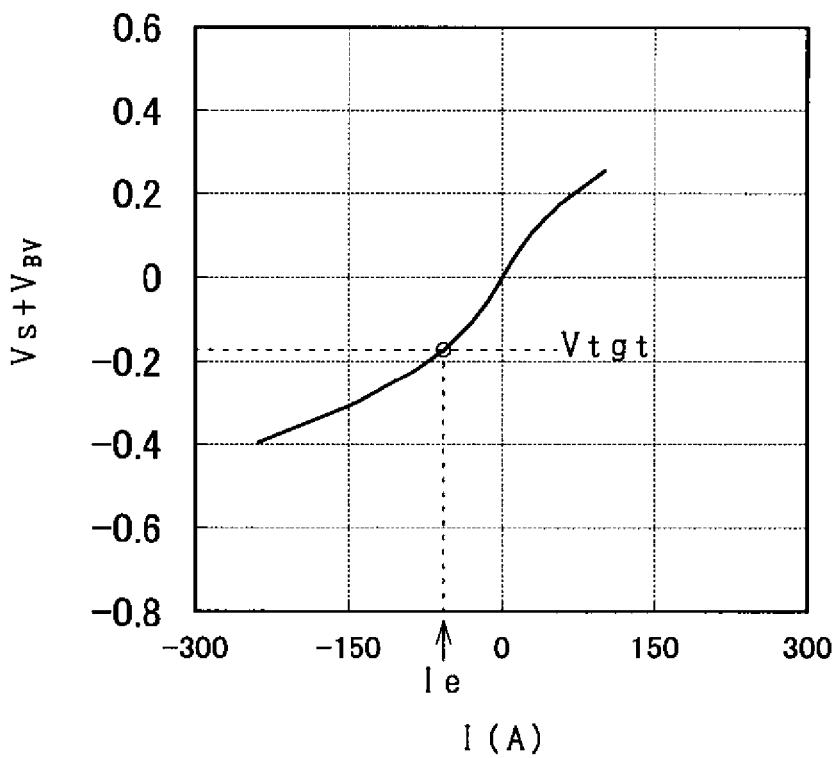
FIG. 18 is a diagram for explaining an outline of a current estimation method.

As shown in FIG. 18, the current estimating unit 35 searches for a current I at which Vs+VBV calculated based on the following equation (eq 26) becomes equal to the target voltage Vtgt represented by the above equation (eq 25), and calculates the current I as the estimated current Ie(k).

[Eq. 26]

$$V_s + V_{BV} = R_s \times I + \frac{\alpha}{\gamma} T_s \cdot \sinh^{-1}(\gamma \cdot \beta_m \cdot I) \quad (eq26)$$

In the above equation (eq 26), the direct current resistance Rs and the charge parameter βm calculated by the parameter calculating unit 40 are used.

In the above equation (eq 25), since the polarization voltage Vw and the open circuit voltage OCV do not vary according to the magnitude of the current, they may be set to fixed values in order to simplify the calculation. Further, the search method is not limited to the bisection method, but it may be a golden section method, for example.

Returning to the explanation of FIG. 3, the calculating unit 32 includes an SOC calculating unit 36. The SOC calculating unit 36 calculates the SOC of the battery cell 20a based on the estimated current Ie calculated by the current estimating unit 35. In the present embodiment, the SOC [%] is calculated based on an initial SOC0 which is an initial value of the SOC, an integrated value of the estimated current Ie calculated by the current estimating unit 35 from when the SOC is the initial SOC0, and a rated capacity Ah0 of the battery cell 20a. Specifically, for example, the SOC may be calculated by the following equation (eq 27).

[Eq. 27]

$$SOC = SOC0 + \frac{\sum Ie \cdot dT}{Ah0} \times 100 \quad (eq27)$$

The initial SOC0 may be calculated, for example, as follows. Specifically, the inter-terminal voltage of the battery cell 20a is detected as the open circuit voltage OCV by the voltage sensor 21 while charging and discharging of the battery pack 20 are not being performed. Then, using the detected open circuit voltage OCV as an input, the initial SOC0 is calculated using the OCV map.

Next, the identifying unit 42 shown in FIG. 5 will be explained.

The identifying unit 42 carries out an identification process for sequentially identifying the first correction coefficient Rk and the second correction coefficient τk by the UKF. This process is a process performed in view of the fact that the resistance parameter Rdm and the time constant parameter τdm deviate from the appropriate values assumed at the time of designing due to deterioration of the battery cell 20*a* or the like. Thus, even when deterioration of the battery cell 20*a* or the like occurs, the accuracy of the voltage estimation by the voltage estimating unit 34 and the accuracy of the current estimation by the current estimating unit 35 are prevented from lowering.

In the present embodiment, targets of identification are not the resistance parameter Rdm and the time constant parameter τdm but the first correction coefficient Rk and the second correction coefficient τk. That is, the resistance parameter Rdm and the time constant parameter τdm are parameters that change exponentially with respect to the temperature of the battery cell as shown in the above equations (eq 17) and (eq 18), and specifically, for example, they may change such that their orders change greatly within the operating temperature range of the battery cell. Therefore, when the UKF is used, it is preferable not to directly identify the resistance parameter Rdm and the time constant parameter τdm, but to identify the first and second correction coefficients Rk, τk which are normalized values of the resistance parameter Rdm and the time constant parameter τdm. As a result, it is possible to avoid deterioration in the identification accuracy of the resistance parameter Rdm and the time constant parameter τdm due to the least significant bit (LSB) of the calculating unit 32.

More specifically, a configuration in which the resistance parameter Rdm and the time constant parameter τdm are directly identified is considered. Since the parameters Rdm and τdm vary greatly depending on the operating temperature of the battery cell, there is a risk that the identification accuracy deteriorates as a result of the temperature of the battery cell changing remarkably while the vehicle is stationary and thus the initial value being shifted remarkably, or as a result of the time required for the parameters Rdm and τdm to converge changing due to a temperature change while the vehicle is traveling. On the other hand, in the present embodiment, the first and second correction coefficients Rk, τk are normalized, and the correction coefficients Rk, τk are stored in the memory 31 even when the vehicle is stopped. Thus, it is possible to correct the initial deviation of the map data immediately after the start of the next vehicle traveling, and stable coefficients can be calculated. In addition, since it is possible to avoid concerns such as loss of significant digits by normalization with the first and second correction coefficients Rk, τk, the identification accuracy can be prevented from deteriorating.

Figure 19:
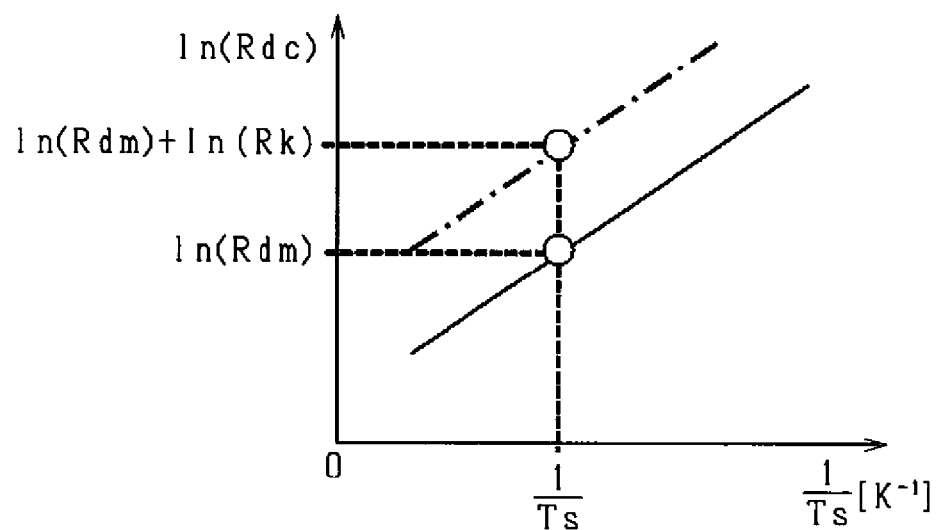

Taking the resistance parameter Rdm as an example to explain this, the first correction coefficient Rk is identified in order to correct the resistance parameter Rdm deviated from the appropriate value due to deterioration of the battery cell 20*a* or the like. In FIG. 19, the Rd map is shown with a solid line. Taking the logarithm of both sides of the above equation (eq 21), the following equation (eq 28) is derived.

[Eq. 28]

$$\ln(R_{dc}) = \ln(R_k) + \ln(R_{dm}) \tag{eq 28}$$

When the first correction coefficient Rk is 1, which is its initial value, ln(Rk) in the following equation (eq 28) is 0. That is, the solid line and the one-dot chain line shown in FIG. 19 coincide. On the other hand, the identified first correction coefficient Rk may take a value other than 1 due to deterioration of the battery cell 20*a* or the like. In this case, as indicated by the one-dot chain line in FIG. 19, the one-dot chain line after the identification may deviate from the solid line. This deviation can be corrected by the first correction coefficient Rk. That is, since the Y intercept of the Arrhenius plot changes due to deterioration or the like, this change is corrected by the first correction coefficient Rk.

The identification process of the identifying unit 42 will be described in detail.

A state variable X(k) is defined as the following equation (eq 29).

[Eq. 29]

$$X(k) = [VV(k) R_k(k) \tau_k(k)] \tag{eq 29}$$

The identifying unit 42 calculates the inter-terminal voltage VV(k) of the battery cell 20*a* composed in the state variable X(k) based on the following equation (eq 30).

[Eq. 30]

$$VV(k) = OCV(k) + V_s(k) + V_{BV}(k) + V_w(k) \tag{eq30}$$
$$= OCV(k) + R_s(k) \cdot I_s(k) + \frac{\alpha}{\gamma} T_s \cdot$$
$$\sinh^{-1}(\gamma \cdot \beta_m \cdot I_s(k)) + V_w(k)$$

In the above equation (eq 29), the open circuit voltage OCV(k) is inputted from the OCV estimating unit 33, the direct current resistance Rs(k) is inputted from the Rs calculating unit 41*a*, and the charge parameter βm(k) is inputted from the β calculating unit 41*b*. Further, the polarization voltage Vw(k) is calculated by a method similar to the calculation method of the polarization voltage at the voltage estimating unit 34, using the resistance parameter Rdm inputted from the R calculating unit 41*c* and the time constant parameter τdm inputted from the τ calculating unit 41*d* as the inputs.

An observed value Y(k) is defined as the following equation (eq 31). That is, in the present embodiment, the observed value Y(k) is the detected voltage CCV(k).

[Eq. 31]

$$Y(k) = CCV(k) \tag{eq 31}$$

It is assumed that the state variable X(k) and the observed value Y(k) follow the nonlinear state space representation of the following equation (eq 32).

[Eq. 32]

$$\left. \begin{array}{l} X(k+1) = f(X(k)) + v(k) \\ Y(k) = h(X(k)) + w(k) \end{array} \right\} \tag{eq32}$$

In the above equation (eq 32), f represents a nonlinear function taking a vector value, and h represents a nonlinear function taking a scalar value. Further, v(k) represents system noise and w(k) represents observation noise. It is assumed that the average value of the system noise v(k) is 0 and its covariance matrix is Q. Further, it is assumed that the average value of the observation noise w(k) is 0 and its covariance matrix is R.

First, the identifying unit 42 performs an initialization process for setting the initial value Xh(0) of the estimated value of the state variable X (hereinafter referred to as the state estimated value Xh). This process is a process of setting the first state estimated value Xh after activation of the battery ECU 30 based on the above equation (eq 29). At the initial value Xh(0) of the state estimated value, an initial value VV(0) of the inter-terminal voltage is calculated from the above equation (eq 30) using the parameters Rs, βm, Rdm, τdm calculated by the calculating units 41a to 41 based on the detected temperature Ts, the detected temperature Ts, the detected current Is, and the latest first and second correction coefficients Rk, τk stored in the memory 31 as the inputs. Further, the initial values Rk(0), τk(0) of the first and second correction coefficients are set to the latest first and second correction coefficients Rk, τk stored in the memory 31.

The initial values Rk(0) and τk(0) of the first and second correction coefficients are set to 1 when the identification process has not been performed in the past even once, and when the identification process has been executed in the past, they are set to the respective values stored in the memory 31 immediately before the last termination of the operation of the battery ECU 30.

Then, the identifying unit 42 performs a calculation process of sigma points. The sigma points are expressed by the following equation (eq 33) using the state estimated value Xh(k−1) and the covariance matrix P(k−1) of the previous calculation cycle.

[Eq. 33]

$$\left.\begin{array}{l}\chi_0(k-1) = Xh(k-1)\\ \chi_i(k-1) = Xh(k-1) + \left(\sqrt{(n+\kappa)P(k-1)}\right)_i \quad i=1,\ldots,n\\ \chi_{n+i}(k-1) = Xh(k-1) - \left(\sqrt{(n+\kappa)P(k-1)}\right)_i \quad i=n+1,\ldots,2n+1\end{array}\right\} \quad (eq33)$$

where
κ: scaling parameter
$\left(\sqrt{(n+\kappa)P(k-1)}\right)_i$:
the $i_{th}$ line component of the square root matrix of matrix$(n+\kappa)P(k-1)$
$L^T L = (n+\kappa)P(k-1)$ The weighting of the sigma points can be performed based on the following expression (eq 34), for example. Wmi represents the weight for the average and Wci represents the weight for the variance.

[Eq. 34]

$$\left.\begin{array}{l}Wm_0 \dfrac{\lambda}{n+\lambda}\\ Wc_0 = \dfrac{\lambda}{n+\lambda} + 1 - d^2 - e \quad d,e > 0\\ Wm_i = Wc_i = \dfrac{1}{2(n+\lambda)} \quad i \neq 0\end{array}\right\} \quad (eq34)$$

where
$\lambda = d^2(n+\kappa) - n$,
$\sum_{i=0}^{2n} Wm_i = 1$,
$\sum_{i=0}^{2n} Wc_i = 1$ Then, the identifying unit 42 performs a time update process. This process includes a process of calculating the sigma point, a process of calculating the state estimated value Xbh, a process of calculating the covariance matrix Pb, and a process of calculating an estimated value of the observed value Y (hereinafter referred to as the estimated observed value Ybh). The calculation process of the sigma point is performed based on the following equation (eq 35). The calculation process of the state estimated value Xbh is performed based on the following equation (eq 36). The calculation process of the covariance matrix Pb is performed based on the following equation (eq 37). The calculation process of the estimated observed value Ybh is performed based on the following equation (eq 38).

[Eq. 35]

$$\chi b_i(k) = f(\chi_i(k-1)) \qquad (eq35)$$

[Eq. 36]

$$Xbh(k) = \sum_{i=0}^{2n} Wm_i \cdot \chi b_i(k) \qquad (eq36)$$

[Eq. 37]

$$Pb(k) = \sum_{i=0}^{2n} Wc_i \{\chi b_i(k) - \chi bh(k)\}\{\chi b_i(k) - Xbh(k)\}^T + Q \qquad (eq37)$$

[Eq. 38]

$$Ybh(k) = \sum_{i=0}^{2n} Wm_i \cdot \phi_i(k) \qquad (eq38)$$

where
$\phi_i(k) = h(\chi b_i(k))$

Next, the identifying unit 42 performs an observed value update process. This processing includes a process of calculating the covariance matrices Pbyy, Pbxy, a process of calculating the Kalman gain G, a process of updating the state estimated value Xh, and a process of updating the covariance matrix P. The calculation process of the covariance matrices Pbyy, Pbxy is performed based on the following equations (eq 39) and (eq 40). The calculation process of the Kalman gain G is performed based on the following equation (eq 41). The process of updating the state estimated value Xh is performed based on the following equation (eq 42). The process of updating the covariance matrix P is performed based on the following equation (eq 43).

[Eq. 39]
$$Pbyy(k) = \sum_{i=0}^{2n} Wc_i\{\phi_i(k) - Ybh(k)\}\{\phi_i(k) - Ybh(k)\}^T + R \quad (eq39)$$

[Eq. 40]
$$Pbxy(k) = \sum_{i=0}^{2n} Wc_i\{\chi b_i(k) - Xbh(k)\}\{\phi_i(k) - Ybh(k)\}^T \quad (eq40)$$

[Eq. 41]
$$G(k) = Pbxy(k)Pbyy(k)^{-1} \quad (eq41)$$

[Eq. 42]
$$Xh(k) = Xbh(k) + G(k)\{Y(k) - Ybh(k)\} \quad (eq42)$$

[Eq. 43]
$$P(k) = Pb(k) - G(k)Pbyy(k)G(k)^T \quad (eq43)$$

According to the identification process performed by the identifying unit 42, the first correction coefficient Rk(k) and the second correction coefficient τk(k) are sequentially identified so that the estimated observed value Ybh(k) and the detected voltage CCV(k) coincide. In other words, the first correction coefficient Rk(k) and the second correction coefficient τk(k) are identified as the optimal solutions for minimizing the error between the estimated observed value Ybh(k) and the detected voltage CCV(k).

In the present embodiment, the first and second correction coefficients Rk(k) and τk(k) are stored in the memory 31 each time the first and second correction coefficients Rk(k) and τk(k) are identified. As a result, the first and second correction coefficients Rk(k) and τk(k) stored in the memory 31 are updated. According to this configuration, upon the next startup of the battery ECU 30, it is possible to set an appropriate initial value Xh(0) of the state estimated value in the above-described initialization process based on the the parameters Rs, βm, Rdm, τdm, based on the detected temperature Ts upon startup, and the first and second correction coefficients Rk, τk stored in the memory 31. Thus, even when the temperature of the battery cell 20a greatly differs between at the time of the termination of the previous operation of the battery ECU 30 and at the time of the current startup, an appropriate initial value Xh(0) of the state estimated value can be set. Therefore, the risk of the solution converging to a local solution in UKF can be reduced.

Figure 20:
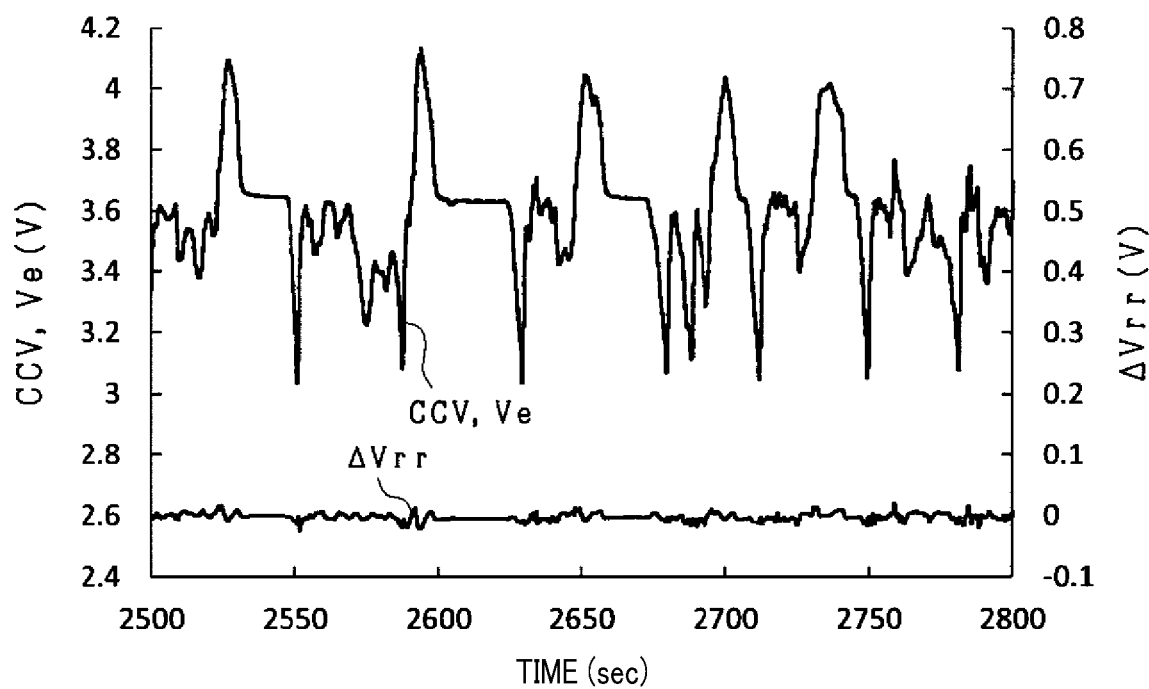
FIG. 20 is a time chart showing a transition of a detected voltage, an estimated voltage, and a voltage error of a battery cell.

FIG. 20 shows a transition of the detected voltage CCV, the estimated voltage Ve calculated by the voltage estimating unit 34, and an error ΔVrr between the estimated voltage Ve and the detected voltage CCV, under a certain driving mode. The driving mode in FIG. 20 is the LA #4 mode.

The illustrated example shows a transition at a low temperature (for example, −20° C.), where the error ΔVrr tends to be large. Even at low temperature, the error ΔVrr is kept very small. Therefore, in FIG. 20, the transition of the detected voltage CCV substantially coincides with the transition of the estimated voltage Ve.

Figure 21:
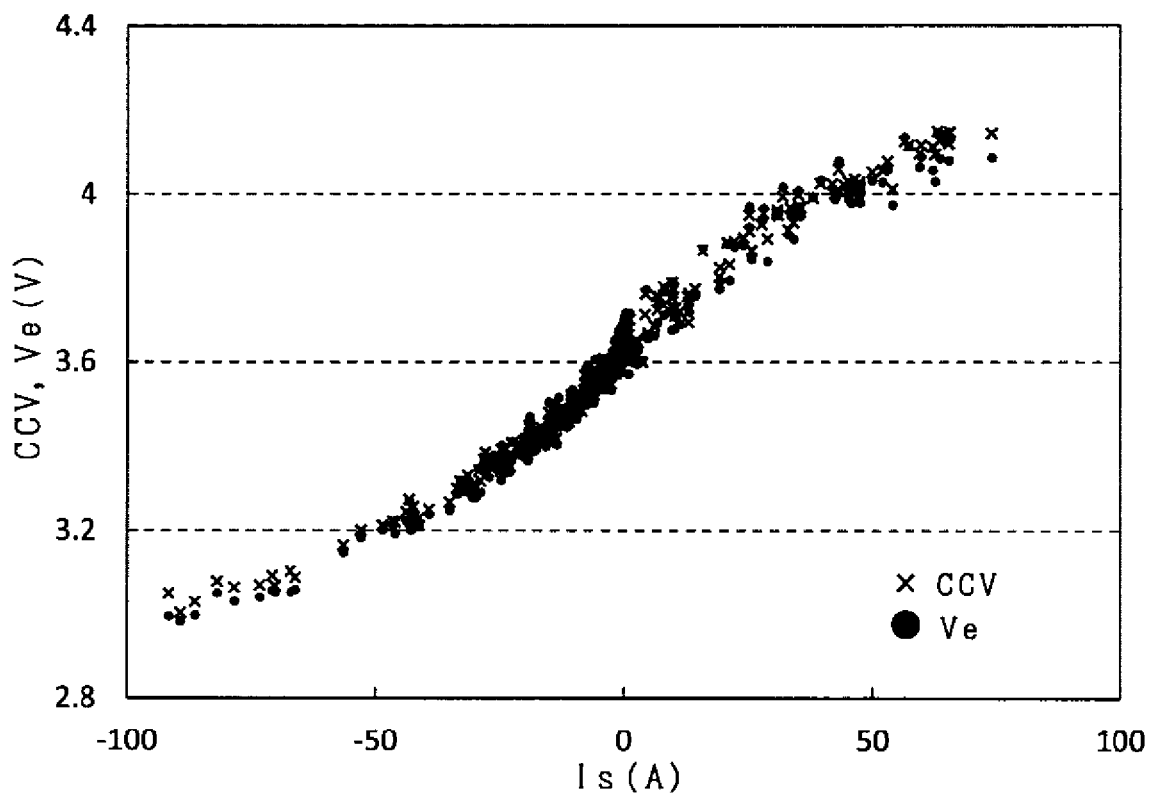
FIG. 21 is a diagram showing a correlation between the detected voltage and the estimated voltage with respect to a detected current.

FIG. 21 shows a correlation of the detected current Is with the estimated voltage Ve and the detected voltage CCV within the data period shown in FIG. 20. As described above, in the present embodiment, since the BV equation is included, the nonlinear characteristics of the current and voltage can be expressed with high accuracy even at low temperature, and further, since identification is performed by UKF, the inter-terminal voltage of the battery cell 20a can be estimated with high accuracy. On the other hand, the conventional battery model which merely combines resistors and capacitors cannot express the above nonlinear characteristics.

Figure 22:
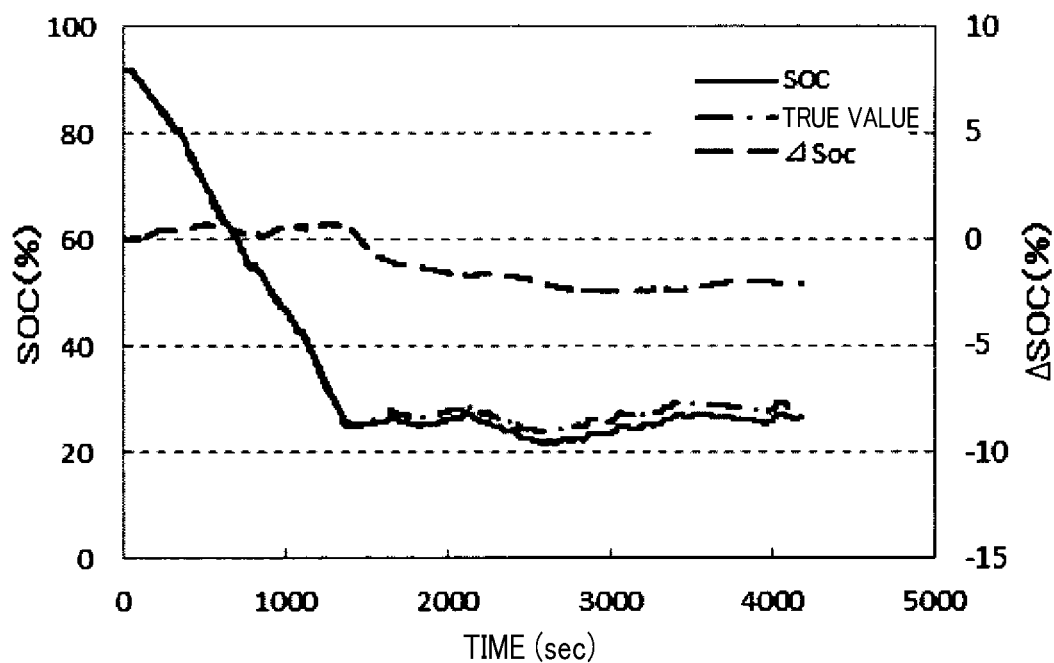
FIG. 22 is a time chart showing a SOC estimation result.

FIG. 22 indicates the transition of the SOC calculated by the SOC calculating unit 36 with a solid line in a case where a pattern of discharging the battery pack 20 from a high SOC region to a low SOC region is carried out. In FIG. 22, the one-dot chain line indicates a true value of the SOC, and the broken line indicates an error ΔSOC between the calculated SOC and the true value.

In the pattern of discharging from the high SOC region to the low SOC region, simulating the diffusion phenomenon of the battery cell 20a with a plurality of RC circuits contributes to an improvement in the calculation accuracy of the SOC. As shown in the diagram, the calculated SOC substantially coincides with the true value.

According to the present embodiment described above, the following effects can be obtained.

The initial value Xh(0) of the state estimated value is set using, as initial values, the direct current resistance Rs, the charge parameter β, the resistance parameter Rdm and the time constant parameter τdm stored in advance in the memory 31. Since the parameters Rs, βm, Rdm, τdm stored in the memory 31 are adapted at the time of designing, they are not greatly deviated from the current parameters Rs, βm, Rdm, τdm corresponding to the current temperature of the battery cell 20a. Thus, the error between the estimated observed value Ybh calculated based on the parameters Rs, βm, Rdm, τdm stored in the memory 31 and the detected voltage CCV will not be large. Accordingly, the parameters Rs, βm, Rdm, τdm stored in the memory 31 are appropriate values for the calculation of the initial value Xh(0) of the state estimated value. Therefore, according to the present embodiment, appropriate initial values of the parameters Rs, βm, Rdm, τdm can be set for the identification of the first and second correction coefficients Rk, τk with the UKF, and thus the initial value Xh(0) of the state estimated value can be set appropriately. This makes it possible to reduce the risk that the solution cannot be found, such as the solution converging to a local solution. Thus, it is possible to avoid deterioration in the identification accuracy of the first and second correction coefficients Rk, τk, and therefore, it is possible to avoid deterioration in the calculation accuracy of the estimated voltage Ve, the estimated current Ie, and the state of charge SOC.

The UKF is used to identify the first and second correction coefficients Rk, τk which are normalized values of the resistance parameter Rdm and the time constant parameter τdm. Therefore, even when the parameters Rdm, τdm greatly differ depending on the temperature of the battery cell 20a, it is possible to avoid loss of significant digits or the like, thereby avoiding decrease in the identification accuracy.

The resistance parameter Rdm and the time constant parameter τdm are determined based on the Foster-type RC equivalent circuit model converted from a transmission line circuit model. Thus, even when the number of RC parallel circuits constituting the RC equivalent circuit model increases, it can be expressed with two variables R and C, and therefore the number of parameters representing the battery model can be reduced.

Second Embodiment

The second embodiment will now be explained with reference to the drawings, focusing on its differences from the first embodiment. In the present embodiment, the calculation method of the SOC calculating unit 36 is changed. In the present embodiment, the detected current Is is inputted to the SOC calculating unit 36 shown in FIG. 3.

Figure 23:
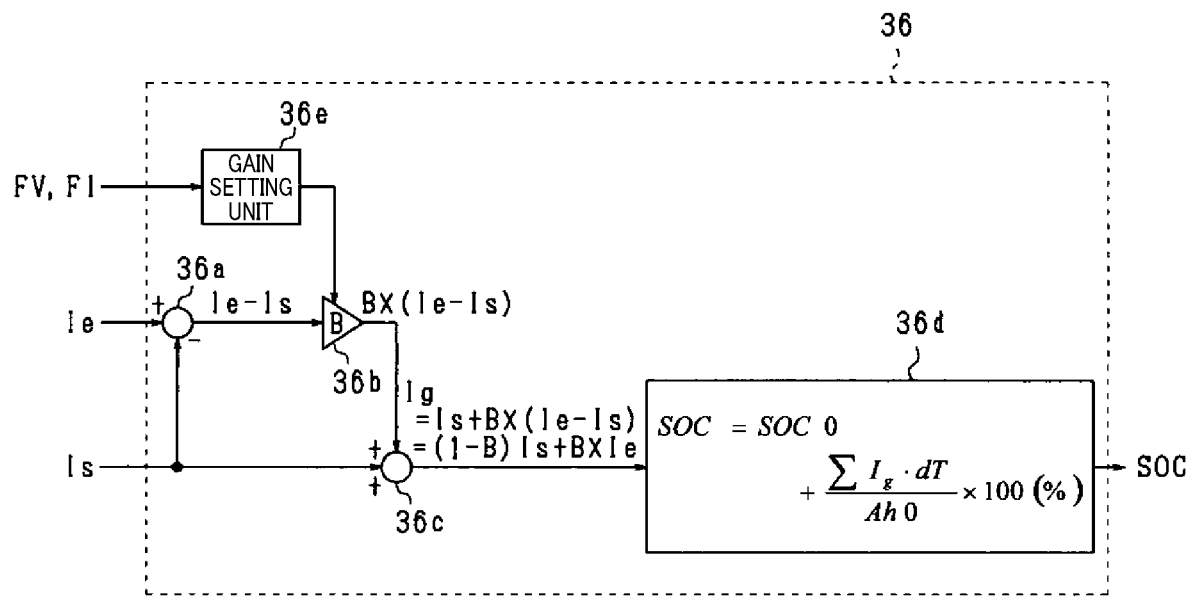
FIG. 23 is a block diagram showing a process of a SOC calculating unit according to a second embodiment.

FIG. 23 is a block diagram of the SOC calculating unit 36 according to the present embodiment.

A deviation calculating unit 36a subtracts the detected current Is from the estimated current Ie calculated by the current estimating unit 35 and outputs the result. A gain multiplying unit 36b multiplies the output value of the deviation calculating unit 36a by the gain B. An adding unit 36c adds the detected current Is to the output value of the gain multiplying unit 36b. A calculating unit 36d calculates the SOC of the battery cell 20a based on the output value Ig of the adding unit 36c. In the present embodiment, the SOC is calculated by changing the estimated current Ie of the above equation (eq 27) to Ig.

Figure 24:
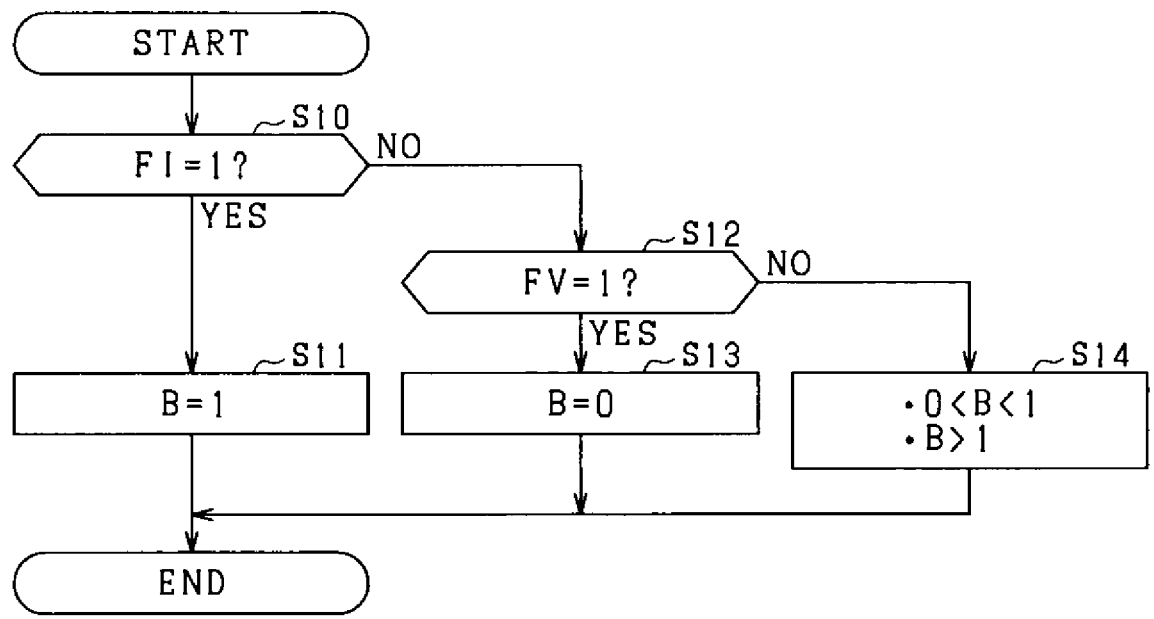
FIG. 24 is a flowchart showing a procedure of a gain setting process.

A gain setting unit 36e performs a gain setting process of setting the gain B used in the gain multiplying unit 36b. FIG. 24 shows the procedure of the gain setting process. This process is repeatedly executed, for example, at predetermined intervals by the gain setting unit 36e.

In this series of processes, first, in step S10, it is determined whether a value of an electric current judgment flag FI is 1 or not. The current judgment flag FI indicates that there is an abnormality related to the current sensor 23 with 1, and indicates that there is no abnormality with 0. In the present embodiment, the abnormality related to the current sensor 23 includes not only a failure in the current sensor 23 itself but also a break in the signal line connecting the current sensor 23 and the battery ECU 30.

When it is determined in step S10 that the value of the current judgment flag FI is 1, it is determined that an abnormality related to the current sensor 23 has occurred, and the process proceeds to step S11. In step S11, the gain B is set to 1. As a result, the current used for calculating the SOC at the calculating unit 36d will be only the estimated current Ie. Therefore, even when there is an abnormality related to the current sensor 23, the calculation of the SOC can be continued. Note that, in the present embodiment, the process of step S11 corresponds to a current abnormality replacement unit.

On the other hand, when it is determined in step S10 that the value of the current judgment flag FI is 0, the process advances to step S12 to determine whether the value of a voltage judgment flag FV is 1 or not. The voltage judgment flag FV indicates that there is an abnormality related to the voltage sensor 21 with 1, and indicates that there is no abnormality with 0. In the present embodiment, the abnormality related to the voltage sensor 21 includes not only a failure in the voltage sensor 21 itself but also a break in the signal line connecting the voltage sensor 21 and the battery ECU 30.

When it is determined in step S12 that the value of the voltage judgment flag FV is 1, it is determined that an abnormality related to the voltage sensor 21 has occurred, and the process proceeds to step S13. In step S13, the gain B is set to 0. As a result, the current used for calculating the SOC at the calculating unit 36d will be only the detected current Is. According to this configuration, in a situation where the reliability of the voltage sensor 21 has lowered, it is possible to switch to the SOC calculation using the detected current Is. Note that, in the present embodiment, the process of step S12 corresponds to a voltage abnormality replacement unit.

On the other hand, when it is determined in step S12 that the value of the voltage judgment flag FV is 0, the process advances to step S14 to set the gain B to any value that is greater than 0 and other than 1. The adjusting of the gain B allows the time it takes until the calculation error of SOC converges to 0 to be adjusted.

Figure 25:
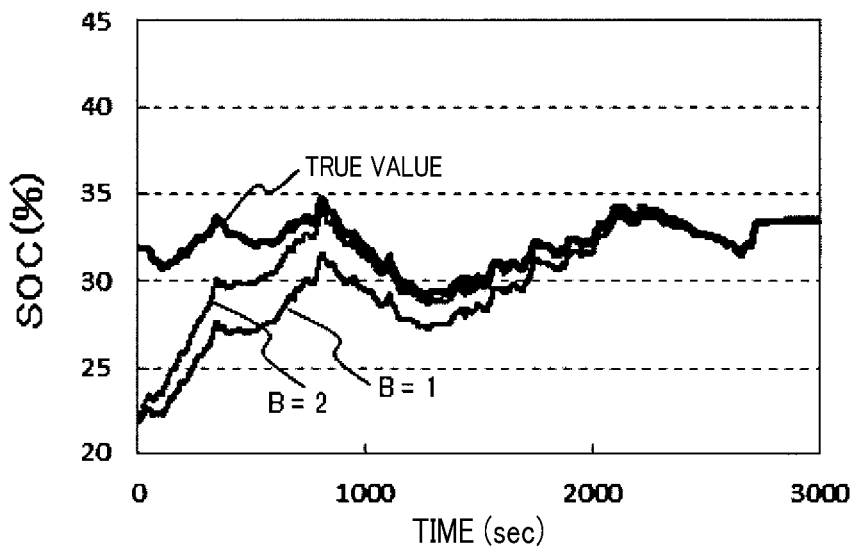
FIG. 25 is a time chart showing a relationship between a magnitude of a gain B and the SOC estimation result.

FIG. 25 shows a transition of SOC when the gain B is set to 1 or 2. In the example shown in FIG. 25, in order to confirm convergence of SOC, an error of −10% with respect to the true value was imparted to the initial SOC0.

When there is an error between the calculated SOC and the true value of the SOC, there will be an error in the estimated current Ie in a direction that makes the error of the SOC converge. Therefore, when the gain B is set to 1, the error of the SOC gradually converges. Further, when the gain B is set to 2, the error between the estimated current Ie and the actual current is doubled, and thus the error of the SOC converges at twice the speed of when the gain B is set to 1. An appropriate gain B may be determined by adaptation since the calculated SOC tends to fluctuate when the gain B is set too large.

Incidentally, as a method of setting the gain B according to the situation of the vehicle, for example, it is possible to adopt a method of setting the gain B to a value smaller than 1 in order to reduce the rate of the SOC calculated while the vehicle is stationary. That is, when the vehicle is stationary and the battery pack 20 is not being charged, the actual SOC does not increase, but there is a risk that the SOC calculated by the calculating unit 36d may increase due to an error in the voltage detection. Therefore, when the vehicle is stationary and the battery pack 20 is not being charged, the calculated SOC can be suppressed from increasing by setting the gain B such that the change of the SOC is slow. As a result, the deviation between the actual SOC and the calculated SOC is suppressed from occurring.

According to the present embodiment described above, the following effects can be obtained.

When it is determined that an abnormality related to the voltage sensor 21 has occurred, the SOC of the battery cell 20a is calculated based on the integrated value of the detected current Is instead of the estimated current Ie. Thus, even when there is an abnormality related to the voltage sensor 21, the calculation of the SOC can be continued, and, for example, the vehicle can be driven to a safe place appropriately.

When it is determined that an abnormality related to the current sensor 23 has occurred, the SOC of the battery cell 20a is calculated based on the integrated value of the estimated current Ie instead of the detected current Is. Thus, even when there is an abnormality related to the current sensor 23, the calculation of the SOC can be continued, and, for example, the vehicle can be driven to a safe place appropriately.

By making the gain B variable, the convergence of SOC can be adjusted. Therefore, it is possible to obtain an SOC convergence in accordance with the use situation of the battery pack 20 and the vehicle.

Third Embodiment

A third embodiment will now be explained with reference to the drawings, focusing on its differences from the first embodiment. In the present embodiment, in addition to the resistance parameter Rdm and the time constant parameter τdm, the charge parameter βm is sequentially identified and updated by the UKF. This is performed in view of the fact that the charge parameter may deviate from the appropriate value due to deterioration of the battery cell 20a or the like.

Figure 26:
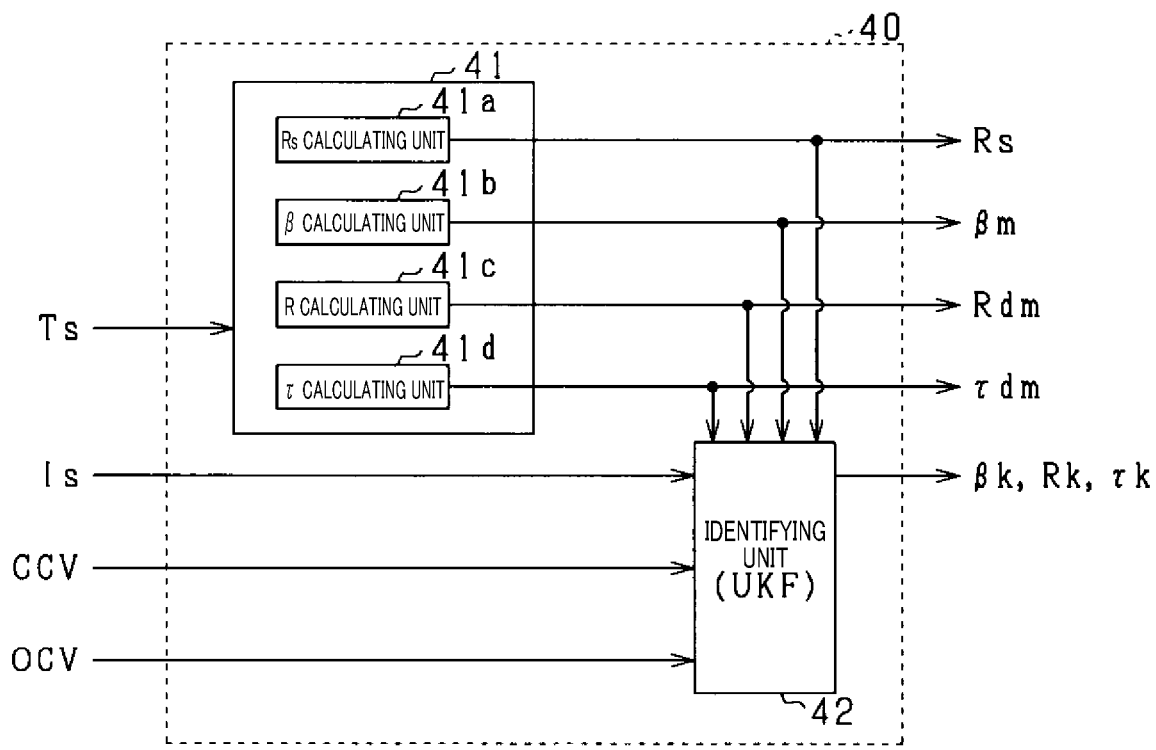
FIG. 26 is a block diagram showing a process of a parameter calculating unit according to a third embodiment.

As shown in FIG. 26, the identifying unit 42 composing the parameter calculating unit 40 sequentially identifies a third correction coefficient βk as a charge correction coefficient for correcting the charge parameter βm. The third correction coefficient βk identified by the identifying unit 42 is sequentially stored in the memory 31. In FIG. 26, for the sake of convenience, the components that are shown in FIG. 5 are denoted by the same reference numbers.

The third correction coefficient βk is a parameter showing the relationship of the following equation (eq 44). In the following equation (eq 44), βc represents the corrected resistance parameter. In the present embodiment, an initial value of the third correction coefficient τk is set to 1, and this value is stored in the memory 31 in advance. The identifying unit 42 according to the present embodiment will be described below in more detail.

[Eq. 44]

$$\beta_c = \beta_k \times \beta_m \quad \text{(eq 44)}$$

Figures 27, 28, 29:
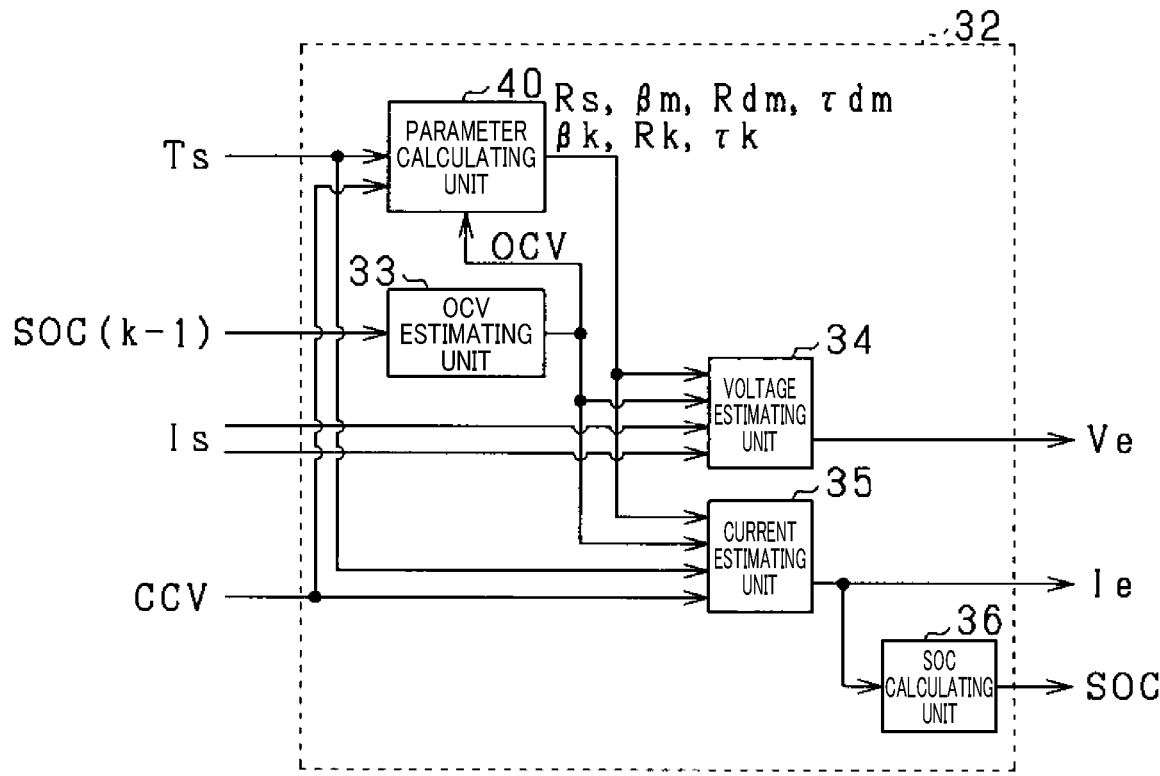
FIG. 27 is a block diagram showing a process of the calculating unit.
FIG. 28 is a diagram showing a conversion table that defines a relationship of a resistance parameter Rd and a time constant parameter τd with resistance values R1 to R3 and time constants τ1 to τ3 according to another embodiment.
FIG. 29 is a diagram showing a conversion table that defines a relationship of a resistance parameter Rd and a time constant parameter τd with resistance values R1, R2 and time constants τ1, τ2 according to yet another embodiment.

As shown in FIG. 27, the third correction coefficient βk identified by the identifying unit 42 is inputted to the voltage estimating unit 34 and the current estimating unit 35. The voltage estimating unit 34 and the current estimating unit 35 calculate the corrected charge parameter βc by multiplying the charge parameter βm calculated by the β calculating unit 41b by the third correction coefficient βk. The voltage estimating unit 34 and the current estimating unit 35 use the corrected charge parameter βc instead of the charge parameter βm in their various calculations.

Note that the charge parameter is a parameter which changes exponentially with respect to the temperature of the battery cell 20a as shown in the above equation (eq 11). Therefore, when the UKF is used, it is preferable not to directly identify the charge parameter but to identify the third correction coefficient βk which is a normalized value of the charge parameter. This is done to avoid degradation in the identification accuracy of the charge parameter due to the least significant bit of the calculating unit 32, similarly to the first embodiment.

Next, the identifying unit 42 according to the present embodiment will be explained, focusing on its differences from the first embodiment.

In the present embodiment, a state variable X(k) is defined as the following equation (eq 45).

[Eq. 45]

$$X(k) = [VV(k) R_k(k) \tau_k(k) \beta_k(k)] \quad \text{(eq 45)}$$

The identifying unit 42 calculates an inter-terminal voltage VV(k) of the battery cell 20a composing the state variable X(k) based on the following equation (eq 46).

[Eq. 46]

$$VV(k) = OCV(k) + R_s(k) \cdot I_s(k) + \frac{\alpha}{\gamma} T_s \cdot \sinh^{-1}(\gamma \cdot \beta_k \cdot \beta_m \cdot I_s(k)) + V_w(k) \quad \text{(eq46)}$$

According to the present embodiment described above, it is possible to sequentially update the charge parameter which changes due to deterioration of the battery cell 20a or the like. As a result, the calculation accuracy of the SOC and the like can be improved.

Other Embodiments

The above embodiments may be modified as follows.

The diffusion resistance model is not limited to the RC equivalent circuit model composed of four parallel connections of resistors and capacitors, but may be one in which the number of the parallel connections is 1 to 3 or 5 or more. FIG. 28 shows a relationship between the resistances R1 to R3 and the resistance parameter Rd and a relationship between the time constants τ1 to τ3 and the time constant parameter τd in a case of three resistors. In this case, a resistance parameter Rd that satisfies the relationship of 3×R=Rd is defined. Further, FIG. 29 shows a relationship between the resistances R1, R2 and the resistance parameter Rd and a relationship between the time constants τ1, τ2 and the time constant parameter τd in a case of two resistors. In this case, a resistance parameter Rd that satisfies the relationship of 2×R=Rd is defined.

The first embodiment may be configured such that the resistance parameter Rdm is stored in the memory 31 in a form according to the above equation (eq 17), whereas the time constant parameter τdm is stored in the memory 31 in a form according to the above equation (eq 18). Then, instead of the first correction coefficient Rk and the second correction coefficient τk, the identification process may directly identify the resistance parameter Rdm and the time constant parameter τdm per se. Further, the second embodiment may be configured such that the charge parameter βm is stored in the memory 31 in a form according to the above equation (eq 11). Then, instead of the third correction coefficient βk, the identification process may directly identify the charge parameter βm itself.

In the first embodiment, the natural logarithm of the resistance parameter Rdm is expressed in the form of a mathematical linear equation with respect to the reciprocal of the detected temperature Ts to be stored in the memory 31, but this is not limited thereto. For example, the natural logarithm of the resistance parameter Rdm may be expressed in the form of a map representing a linear equation with respect to the reciprocal of the detected temperature Ts to be stored in the memory 31. In this case, a natural logarithmic value corresponding to the detected temperature Ts is selected from the values of the natural logarithm of the resistance parameter Rdm stored in the memory. Then, the selected natural logarithm value is converted into the resistance parameter Rdm, and the corrected resistance parameter Rdc is calculated based on the above equation (eq 21). When adopting the configuration in which the data is stored in the form of a map in the memory 31, the map may be created by measuring at least three temperature points of the battery cell 20a. Thus, the adaptation work of the map can be easily performed. The same applies to the time constant parameter τdm and the charge parameter βm.

The calculation methods of the parameters constituting the diffusion resistance model are not limited to those shown in FIG. 15 of the first embodiment. For example, the resistance values R1 to R4 may be calculated based on the following equation (eq 47), and the capacitances C1 to C4 may be calculated based on the following equation (eq 48).

[Eq. 47]

$$R_m = \frac{8 \cdot R_d}{(2m-1)^2 \pi^2} \quad (eq47)$$

[Eq. 48]

$$C_m = \frac{\tau_d}{2 \cdot R_d} \quad (eq48)$$

In the above equations (eq 47) and (eq 48), m represents a positive integer, specifically 1 to 4. A polarization voltage Vw in the above equation (eq 24) can be calculated based on the resistance values R1 to R4 and the capacitances C1 to C4 calculated based on the above equations (eq 47) and (eq 48). In the above equation (eq 24), the time constants τ1 to τ4 can be calculated based on the relationship τm=Rm×Cm (m=1, 2, 3, 4).

The above expressions (eq 47) and (eq 48) are based on documents including those describing an equivalent circuit matching with the Warburg impedance and the rule of the equivalent circuit parameter expressed as a series that becomes equivalent to the Warburg impedance. The above documents include, for example, Modelling Ni-MH battery using Cauer and Foster structures. E. Kuhn et al. JOUNAL of Power Sources 158 (2006).

In FIG. 23 of the second embodiment, the deviation calculating unit 36a may subtract the estimated current Ie calculated by the current estimating unit 35 from the detected current Is and output the result Is−Ie. In this case, the gain setting process performed by the gain setting unit 36e may be as follows. Specifically, the process in step S11 is replaced with a process of setting the gain B to −1, and the process in step S14 is replaced with a process of setting the gain B to a value that is smaller than 0 and not −1.

The battery cell 20a is not limited to a lithium ion secondary battery, but may be another secondary battery such as a nickel hydrogen battery.

Application targets of the present disclosure are not limited to vehicles.

Although the present disclosure is described based on examples, it should be understood that the present disclosure is not limited to the examples and structures. The present disclosure encompasses various modifications and variations within the scope of equivalents thereof. In addition, the scope of the present disclosure and the spirit include other combinations and embodiments, only one component thereof, and other combinations and embodiments that are more than that or less than that.

What is claimed is:

1. A battery state estimating device configured to estimate a state of a secondary battery based on a battery model of the secondary battery, comprising:
    the battery model which includes a series connection of:
        a direct current resistance model representing a direct current resistance of the secondary battery;
        a charge transfer resistance model representing a charge transfer resistance of the secondary battery, the charge transfer resistance model including a charge parameter correlated with an exchange current density, the charge parameter being derived from the Butler-Volmer equation; and
        a diffusion resistance model representing a diffusion resistance of the secondary battery, the diffusion resistance model being at least one RC equivalent circuit model including a resistor and a capacitor; wherein
    a parameter related to a resistance component of the diffusion resistance model is defined as a resistance parameter, and a parameter related to a time constant of the diffusion resistance model is defined as a time constant parameter;
    the battery state estimating device further includes a storage unit in which information on the resistance parameter, the time constant parameter, and the charge parameter are stored in advance in association with temperature information of the secondary battery;
    a parameter calculating unit configured to calculate the resistance parameter, the time constant parameter, and the charge parameter corresponding to the detected temperature value based on a detected temperature value of the secondary battery and the information stored in the storage unit; and
    a state estimating unit configured to estimate a state of the secondary battery based on the resistance parameter, the time constant parameter, and the charge parameter calculated by the parameter calculating unit; wherein
    the parameter calculating unit includes an identifying unit configured to sequentially identify the resistance parameter and the time constant parameter used for estimating the state of the secondary battery in the state estimating unit with a Kalman filter using the resistance parameter and the time constant parameter calculated by the parameter calculating unit as initial values,
    the identifying unit sequentially identifies the charge parameter used in the state estimating unit with a Kalman filter using the resistance parameter, the time constant parameter, and the charge parameter calculated by the parameter calculating unit as initial values,
    the charge parameter is a parameter that defines a relationship between a current flowing through the secondary battery and a potential difference of the charge transfer resistance in an inverse hyperbolic sine function in which the current flowing through the secondary battery is an independent variable and the potential difference of the charge transfer resistance is a dependent variable, and is a parameter that increases exponentially as the reciprocal of the temperature of the secondary battery increases,
    the storage unit stores information in which a natural logarithm of the charge parameter is related with the reciprocal of the temperature of the secondary battery,
    the state estimating unit estimates the state of the secondary battery based on a value obtained by multiplying the charge parameter by a charge correction coefficient, and
    the identifying unit includes:
        a first processing unit configured to sequentially identify the charge correction coefficient with a Kalman filter using the resistance parameter, the time constant parameter, and the charge parameter calculated by the parameter calculating unit as initial values, and
        a second processing unit configured to update the charge parameter used in the state estimating unit by multiplying the charge parameter by the charge correction coefficient identified by the first processing unit.

2. The battery state estimating device according to claim 1, wherein
    the state estimating unit includes at least one of a voltage estimating unit configured to estimate an inter-terminal voltage of the secondary battery based on the resistance parameter, the time constant parameter, and the charge parameter calculated by the parameter calculating unit and a detected current value flowing through the secondary battery, and a current estimating unit configured to estimate a current flowing through the secondary battery based on the resistance parameter, the time constant parameter, and the charge parameter calculated by the parameter calculating unit and a detected inter-terminal voltage value of the secondary battery.

3. The battery state estimating device according to claim 2, wherein
the state estimating unit includes the current estimating unit; and
the state estimating unit includes a voltage abnormality replacement unit which calculates a state of charge of the secondary battery based on the detected current value instead of the current estimated by the current estimating unit when it is determined that there is an abnormality related to a voltage detecting unit configured to detect the inter-terminal voltage of the secondary battery.

4. The battery state estimating device according to claim 2, wherein
the state estimating unit includes the current estimating unit; and
the state estimating unit includes a current abnormality replacement unit which calculates a state of charge of the secondary battery based on the current estimated by the current estimating unit instead of the detected current value when it is determined that there is an abnormality related to a current detecting unit configured to detect the current flowing through the secondary battery.

5. The battery state estimating device according to claim 4, wherein
the state estimating unit includes a state of charge calculating unit configured to calculate the state of charge of the secondary battery based on a value obtained by multiplying a difference between the current estimated by the current estimating unit and the detected current value by a gain and the detected current value; and
the current abnormality replacement unit switches the value of the gain so that the detected current value used for calculating the state of charge becomes zero when it is determined that there is an abnormality related to the current detecting unit.

6. The battery state estimating device according to claim 2, wherein
the state estimating unit includes the current estimating unit; and
the state estimating unit includes a state of charge calculating unit configured to calculate the state of charge of the secondary battery based on a value obtained by multiplying a difference between the current estimated by the current estimating unit and the detected current value by a gain and the detected current value.

7. A battery state estimating device configured to estimate a state of a secondary battery based on a battery model of the secondary battery, comprising:
the battery model which includes a series connection of:
a direct current resistance model representing a direct current resistance of the secondary battery;
a charge transfer resistance model representing a charge transfer resistance of the secondary battery, the charge transfer resistance model including a charge parameter correlated with an exchange current density, the charge parameter being derived from the Butler-Volmer equation; and
a diffusion resistance model representing a diffusion resistance of the secondary battery, the diffusion resistance model being at least one RC equivalent circuit model including a resistor and a capacitor; wherein
a parameter related to a resistance component of the diffusion resistance model is defined as a resistance parameter, and a parameter related to a time constant of the diffusion resistance model is defined as a time constant parameter;
the battery state estimating device further includes a storage unit in which information on the resistance parameter, the time constant parameter, and the charge parameter are stored in advance in association with temperature information of the secondary battery;
a parameter calculating unit configured to calculate the resistance parameter, the time constant parameter, and the charge parameter corresponding to the detected temperature value based on a detected temperature value of the secondary battery and the information stored in the storage unit; and
a state estimating unit configured to estimate a state of the secondary battery based on the resistance parameter, the time constant parameter, and the charge parameter calculated by the parameter calculating unit wherein
the parameter calculating unit includes an identifying unit configured to sequentially identify the resistance parameter and the time constant parameter used for estimating the state of the secondary battery in the state estimating unit with a Kalman filter using the resistance parameter and the time constant parameter calculated by the parameter calculating unit as initial values,
the diffusion resistance model is a model obtained by converting a transmission line circuit model including a resistor and a capacitor into a Foster type RC equivalent circuit model including a series connection of a plurality of RC parallel circuits,
the parameter calculating unit includes:
a constant calculating unit configured to calculate resistance values of resistors composing the RC parallel circuits based on the resistance parameter calculated by the parameter calculating unit, and calculate time constants of the RC parallel circuits based on the time constant parameter calculated by the parameter calculating unit; and
a polarization voltage calculating unit configured to calculate a polarization voltage of the diffusion resistance model based on the resistance values and the time constants calculated by the constant calculating unit, and
the identifying unit sequentially identifies the resistance parameter and the time constant parameter with a Kalman filter based on the polarization voltage calculated by the polarization voltage calculating unit.

8. The battery state estimating device according to claim 7, wherein
the resistance parameter and the time constant parameter are parameters which increase exponentially as the reciprocal of the temperature of the secondary battery increases;
the storage unit stores information in which a natural logarithm of the resistance parameter and a natural logarithm of the time constant parameter are correlated with the reciprocal of the temperature of the secondary battery; and
the state estimating unit estimates the state of the secondary battery based on a value obtained by multiplying the resistance parameter by a first correction coefficient and a value obtained by multiplying the time constant parameter by a second correction coefficient; wherein the identifying unit includes:

a first processing unit configured to sequentially identify the first correction coefficient and the second correction coefficient with a Kalman filter and using the resistance parameter and the time constant parameter calculated by the parameter calculating unit as the initial values; and a second processing unit configured to update the resistance parameter used in the state estimating unit by multiplying the resistance parameter by the first correction coefficient identified by the first processing unit and update the time constant parameter used in the state estimating unit by multiplying the time constant parameter by the second correction coefficient identified by the first processing unit.

9. The battery state estimating device according to claim 7, wherein the state estimating unit includes at least one of a voltage estimating unit configured to estimate an inter-terminal voltage of the secondary battery based on the resistance parameter, the time constant parameter, and the charge parameter calculated by the parameter calculating unit and a detected current value flowing through the secondary battery, and a current estimating unit configured to estimate a current flowing through the secondary battery based on the resistance parameter, the time constant parameter, and the charge parameter calculated by the parameter calculating unit and a detected inter-terminal voltage value of the secondary battery.

10. The battery state estimating device according to claim 9, wherein the state estimating unit includes the current estimating unit; and the state estimating unit includes a voltage abnormality replacement unit which calculates a state of charge of the secondary battery based on the detected current value instead of the current estimated by the current estimating unit when it is determined that there is an abnormality related to a voltage detecting unit configured to detect the inter-terminal voltage of the secondary battery.

11. The battery state estimating device according to claim 9, wherein the state estimating unit includes the current estimating unit; and the state estimating unit includes a current abnormality replacement unit which calculates a state of charge of the secondary battery based on the current estimated by the current estimating unit instead of the detected current value when it is determined that there is an abnormality related to a current detecting unit configured to detect the current flowing through the secondary battery.

12. The battery state estimating device according to claim 11, wherein the state estimating unit includes a state of charge calculating unit configured to calculate the state of charge of the secondary battery based on a value obtained by multiplying a difference between the current estimated by the current estimating unit and the detected current value by a gain and the detected current value; and the current abnormality replacement unit switches the value of the gain so that the detected current value used for calculating the state of charge becomes zero when it is determined that there is an abnormality related to the current detecting unit.

13. The battery state estimating device according to claim 9, wherein the state estimating unit includes the current estimating unit; and the state estimating unit includes a state of charge calculating unit configured to calculate the state of charge of the secondary battery based on a value obtained by multiplying a difference between the current estimated by the current estimating unit and the detected current value by a gain and the detected current value.

* * * * *